(12) United States Patent
Takayoshi

(10) Patent No.: US 8,159,528 B2
(45) Date of Patent: Apr. 17, 2012

(54) VISUAL DISPLAY APPARATUS

(75) Inventor: Togino Takayoshi, Shibuya-ku (JP)

(73) Assignee: Olympus Corporation, Toyko (JP)

( * ) Notice: Subject to any disclaimer, the term of this patent is extended or adjusted under 35 U.S.C. 154(b) by 1420 days.

(21) Appl. No.: 11/729,769

(22) Filed: Mar. 28, 2007

(65) Prior Publication Data
US 2007/0229952 A1    Oct. 4, 2007

(30) Foreign Application Priority Data
Apr. 3, 2006  (JP) .................................. 2006-101737

(51) Int. Cl.
*H04N 13/04*    (2006.01)

(52) U.S. Cl. .................. 348/51; 348/E13.054; 359/446; 359/458; 359/462; 359/478; 353/7

(58) Field of Classification Search ...... 348/51
See application file for complete search history.

(56) References Cited

U.S. PATENT DOCUMENTS

| 5,111,313 A | 5/1992 | Shires |
| 5,704,061 A * | 12/1997 | Anderson ............. 396/330 |
| 6,141,034 A | 10/2000 | McCutchen |
| 2003/0086167 A1 | 5/2003 | Sonehara |
| 2004/0196362 A1 | 10/2004 | Hoshino et al. |
| 2005/0030621 A1 * | 2/2005 | Takahashi et al. ............. 359/464 |
| 2006/0055887 A1 | 3/2006 | Hoshino et al. |

FOREIGN PATENT DOCUMENTS

| JP | 2005-221690 | 8/2005 |
| JP | 2006-010852 | 1/2006 |
| JP | 2006-011367 | 1/2006 |
| WO | WO 97/35229 | 9/1997 |

* cited by examiner

*Primary Examiner* — Yves Dalencourt
(74) *Attorney, Agent, or Firm* — Kenyon & Kenyon LLP

(57) ABSTRACT

A visual display apparatus suitable for use with a viewing apparatus capable of providing stereoscopic view of an image from 360-degree directions around it, or a display apparatus capable of displaying an observation image that changes depending on what angle it is viewed at or who views it, is described. The visual display apparatus comprises a main optical system that is concentric and rotationally symmetric about a center axis and a plurality of subordinate optical systems of identical construction, which are juxtaposed on a circumference concentric about the center axis. A combined optical system comprising the main optical system and each subordinate optical system has an exit pupil positioned on a side of the main optical system that faces away from each subordinate optical system and on a side of the center axis that faces away from each subordinate optical system on an optical path.

38 Claims, 24 Drawing Sheets

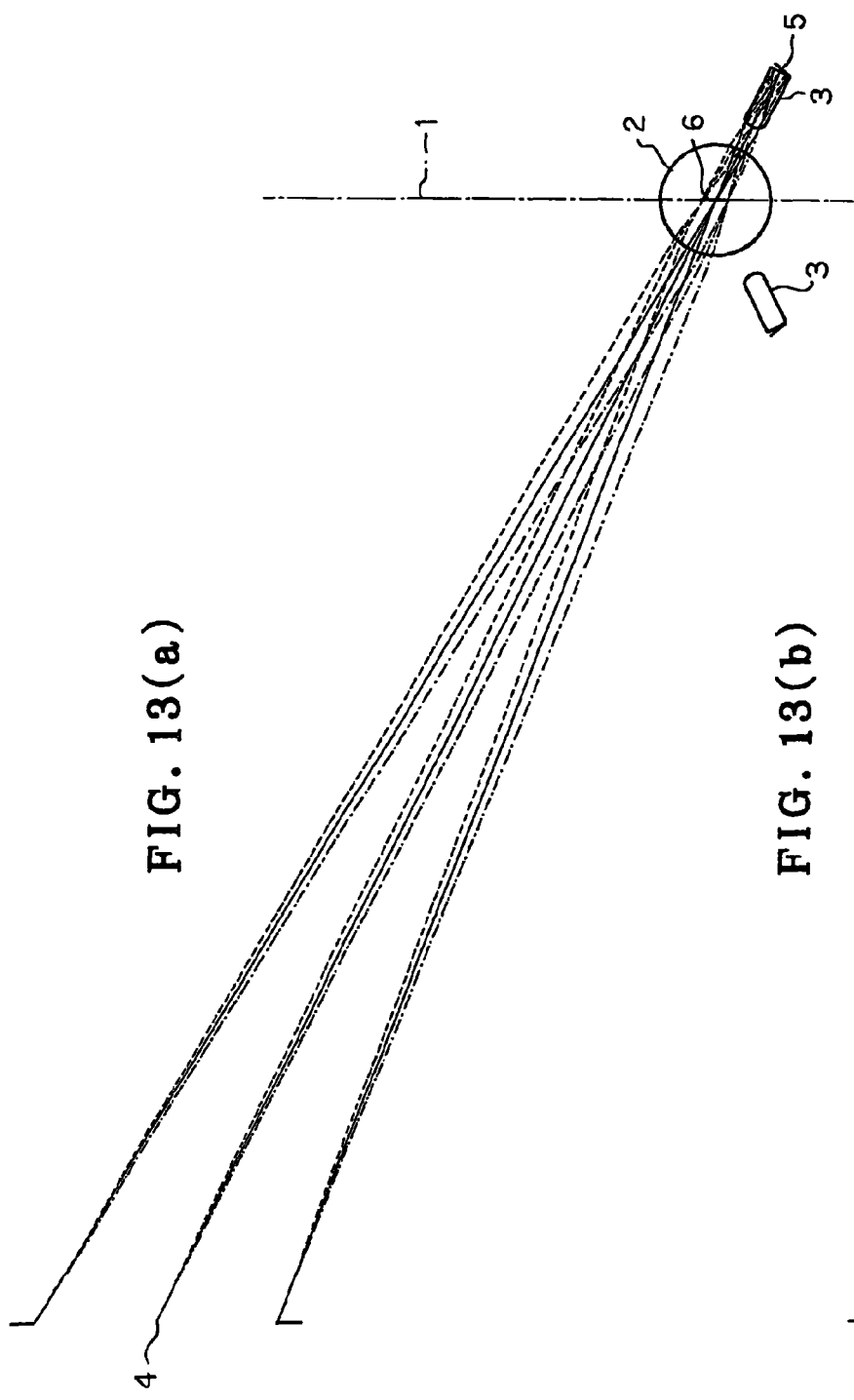
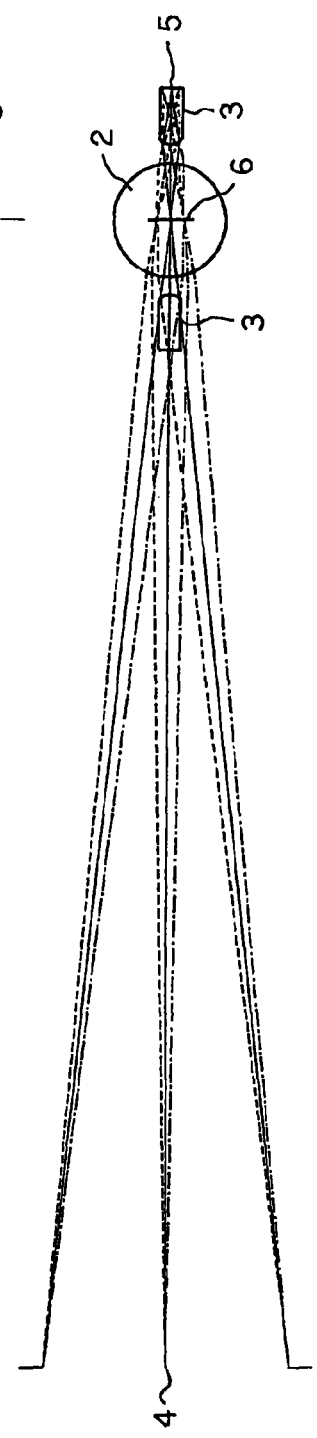
FIG. 13(a)
FIG. 13(b)

VISUAL DISPLAY APPARATUS

This application claims benefit of Japanese Application No. 2006-101737 filed in Japan on Apr. 3, 2006, the contents of which are incorporated by this reference.

BACKGROUND OF THE INVENTION

The present invention relates generally to a visual display apparatus, and more particularly to a visual display apparatus suitable for use with a viewing apparatus that makes sure stereoscopic viewing of images from every direction around them without using spectacles or the like, or a display apparatus capable of displaying images varying depending on what angle they are viewed at or who views them.

So far, there are some display apparatus known from Patent Publications 1, 2 and 3, in which while a screen having a angle-of-field limiting filter is rotated about a center axis, for instance, an image of one object as viewed from 360-degree directions around it is projected onto that screen, whereby that image changes depending on an arbitrary direction of viewing to make sure stereoscopic viewing of that image.

Patent Publication 1
JP(A) 2005-221690
Patent Publication 2
JP(A) 2006-10852
Patent Publication 3
JP(A) 2006-11367

With the prior art apparatus known from Patent Publications 1, 2 and 3, however, a mechanism for mechanically rotating the screen having an angle-of-field limiting filer is required, and an image viewable in a specific direction of viewing can be only intermittently seen. Further, never until now is there any display apparatus capable of stereoscopically viewing an image without using glasses or the like, i.e., with the naked eye, and capable of viewing an image from any of 360-degree directions around it.

SUMMARY OF THE INVENTION

In view of such situations with the prior art, an object of the invention is to provide a visual display apparatus suitable for use with a viewing apparatus capable of stereoscopically viewing images from 360-degree directions around them without using any mechanically complicated rotary mechanism, glasses or the like, or a display apparatus capable of displaying images depending on what angle they are viewed at or who views them.

According to the invention, the aforesaid object is achievable by the provision of a visual display apparatus, characterized by comprising a main optical system that is concentric and rotationally symmetric about a center axis and a plurality of subordinate optical systems of identical construction, which are juxtaposed on a circumference concentric about the center axis, wherein a combined optical system comprising the main optical system and each subordinate optical system has an exit pupil positioned on a side of the main optical system that faces away from each subordinate optical system and on a side of the center axis that faces away from each subordinate optical system on an optical path, display planes of display devices are located on a side of the respective subordinate optical systems that face away from the main optical system, images on display planes by the respective combined optical systems are formed near the center axis, and exit pupils of the respective combined optical systems are formed concentrically about the center axis in a substantially back-to-back relation.

In this case, images taken of an identical object from a plurality of points of view are displayed on said display planes so that they can be stereoscopically viewed.

In the invention, the aforesaid display planes may be formed by the rotationally symmetric location of a plurality of planar display devices.

In the invention, the aforesaid display planes may be configured by rounding off a two-dimensional display device into a three-dimensional one.

In the invention, it is desired that at least one surface of said main optical system varies in curvature between a longitudinal section including an axis of rotational symmetry and a cross section orthogonal to the axis of rotational symmetry.

In the invention, at least one surface of said main optical system may have a rotationally symmetric configuration formed by the rotation of a curve of any desired shape having no plane of symmetry about the axis of rotational symmetry. In this case, the rotationally symmetric configuration may be formed by the rotation of a curve of any desired shape including an odd-numbered term about the axis of rotational symmetry.

In the invention, it is desired for the main optical system to satisfy the following condition:

$$10 \text{ mm} < Rs \tag{1}$$

where Rs is half the outside diameter of said main optical system.

In the invention, it is desired that there is a light block member located in an area through which light rays do not transmit.

In the invention, there may be an illumination unit provided so as to illuminate the whole of said display planes from every direction on a side opposite to a side of said subordinate optical systems.

According to the invention as described above, it is possible to provide a visual display apparatus which, without recourse to a mechanically complicated rotary mechanism, glasses or the like, enables a viewer to view an image having parallaxes upon viewing from around it, thereby viewing a stereoscopic image. It is also possible to provide a visual display apparatus capable of displaying an observation image that varies depending on what angle it is viewed at or who views it.

Still other objects and advantages of the invention will in part be obvious and will in part be apparent from the specification.

The invention accordingly comprises the features of construction, combinations of elements, and arrangement of parts which will be exemplified in the construction hereafter set forth, and the scope of the invention will be indicated in the claims.

BRIEF DESCRIPTION OF THE DRAWINGS

FIG. 13(*a*) is a sectional view of the optical system in the visual display apparatus according to Example 1 of the invention, as taken along the center axis, and FIG. 13(*b*) is a plan view of an optical path through the optical system as viewed in a direction along the center axis.

DESCRIPTION OF THE PREFERRED EMBODIMENTS

The visual display apparatus of the invention is now explained with reference to its embodiments.

The basic principles of the visual display apparatus of the invention are that there is a main optical system provided, which is concentric and rotationally symmetric about a center axis, and a plurality of subordinate optical systems of identical construction are juxtaposed on a circumference concentric about the center axis, wherein a combined optical system comprising the main optical system and each subordinate optical system has an exit pupil positioned on a side of the main optical system that faces away from each subordinate optical system and on a side of the center axis that faces away from each subordinate optical system on an optical path, display planes of display devices are located on a side of the respective subordinate optical systems that face away from the main optical system, images on display planes by the respective combined optical systems are formed near the center axis, and exit pupils of the respective combined optical systems are formed concentrically about the center axis in a substantially back-to-back relation.

Referring here to an optical system designed such that the direction of a center axis is viewed from around it, when that optical system is a conventional rotationally symmetric one with its image plane orthogonal to the center axis, it is required to bend light rays largely. As a result, there is a large distortion of an image viewed from around the center axis, which renders it impossible to make sure a relatively large viewing area.

Therefore, the greatest feature of the invention is that a rotationally symmetric optical system that functions as an enlarging image-formation optical system in any of directions from around its center axis is located with its axis of rotational symmetry (the center axis) as the vertical direction, so that an image can be viewed from viewing from every horizontal direction substantially vertical to the axis of rotational symmetry.

By use of such arrangement, the invention has succeeded in obtaining an enlarging viewing optical system (visual display apparatus) that has the axis of rotational symmetry as the vertical direction and enables a viewer to view an image from every horizontal direction.

Figure 14:
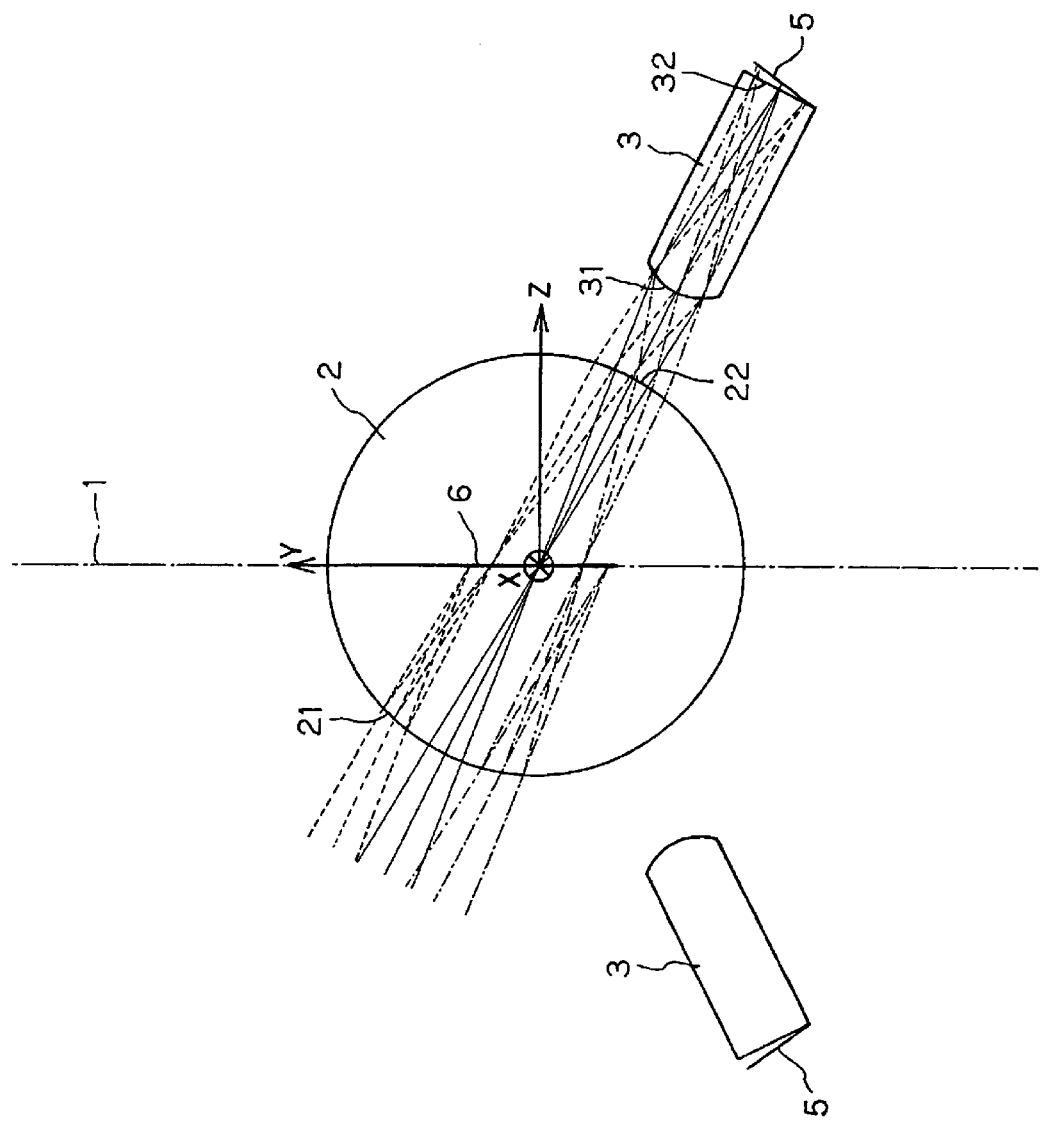
FIG. 14 is an enlarged view of part of FIG. 13(*a*).
Figure 15:
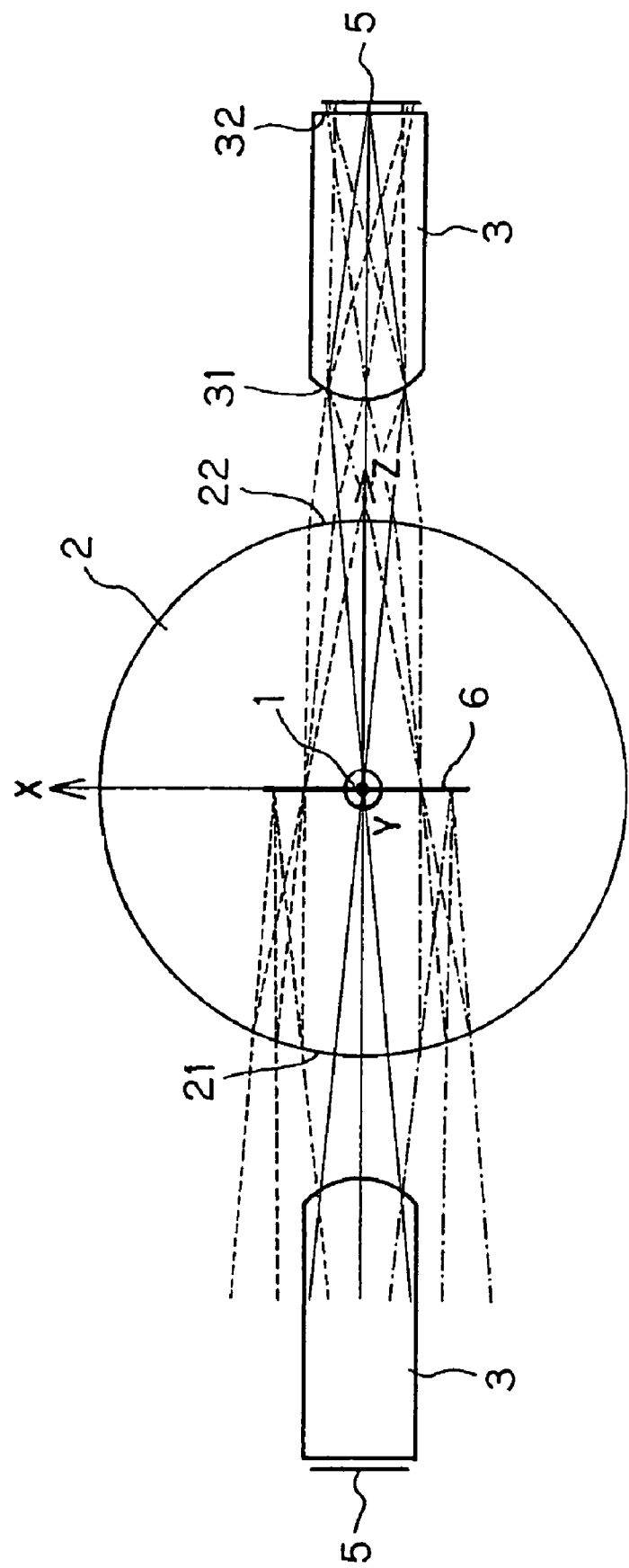
FIG. 15 is an enlarged view of part of FIG. 13(*b*).
Figure 16:
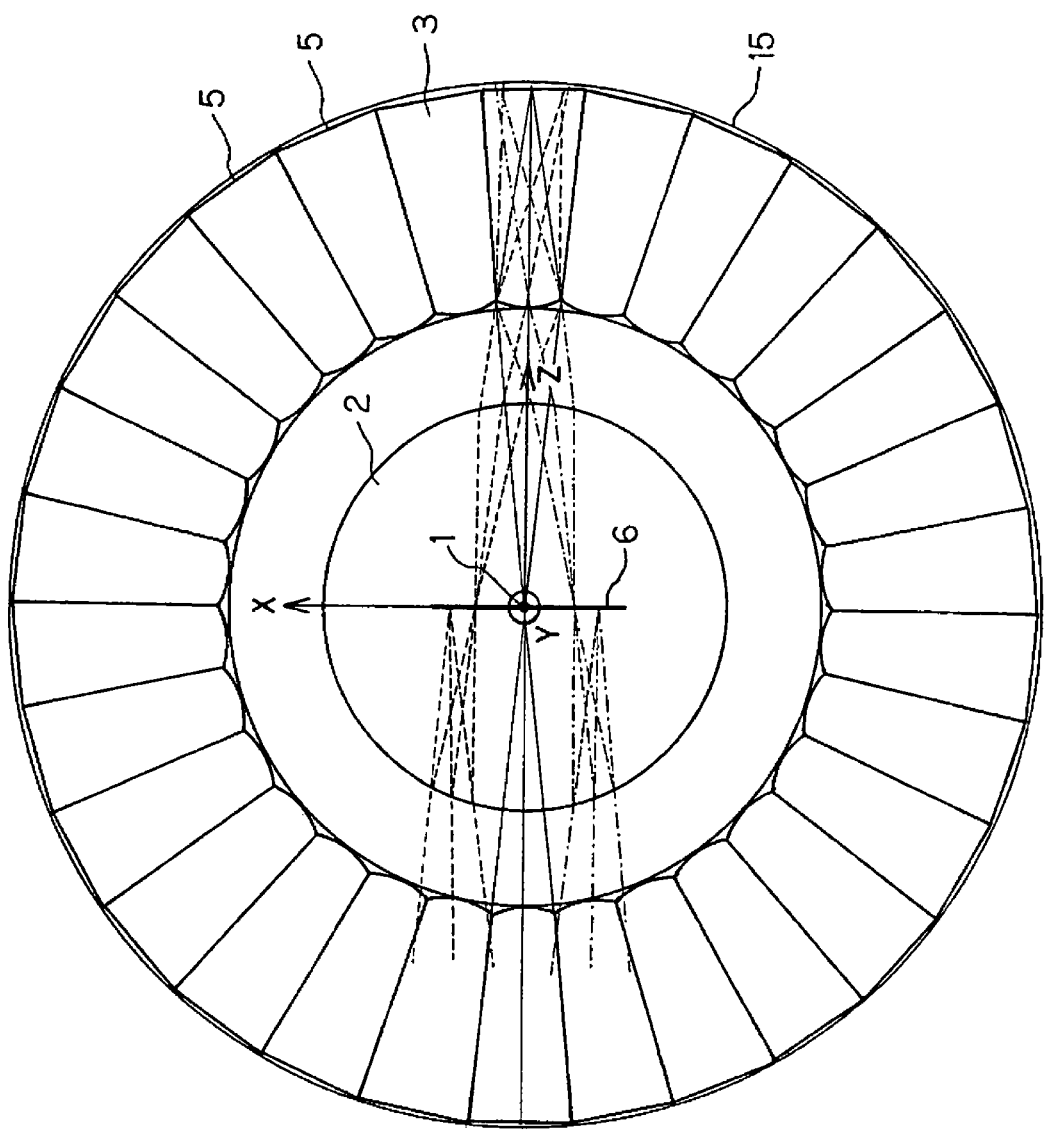
FIG. 16 is a plan view of the whole optical system of Example 1 as viewed in a direction along the center axis.

The invention is now explained with reference to the accompanying drawings. FIG. 13(*a*) is a sectional view of the optical system in the visual optical apparatus according to Example 1 of the invention, given later, as taken along the center axis, and FIG. 13(*b*) is a plan view of an optical path through that optical system as viewed in a direction along the center axis. FIG. 14 is an enlarged view of part of FIG. 13(*a*); FIG. 15 is an enlarged view of part of FIG. 13(*b*); and FIG. 16 is a plan view of the whole optical system as viewed in a direction along the center axis. In FIGS. 13 to 15, only some of subordinate optical systems 3 and display planes 5 are shown.

The visual display apparatus of the invention is now explained with reference to FIGS. 13 through 16 in particular.

Referring to the optical system in the visual display apparatus of the invention, a main optical system 2 concentric and rotationally symmetric about a center axis 1 is located. While it is here described that the main optical system 2 comprises a ball unit (ball lens), it is contemplated that for it not only is a single refractive unit having positive power used, but any of a catoptric system, catadioptric system and a combined optical system is also usable; that is, the requirement for the main optical system 2 is that it gives positive power to a light beam traveling toward the center axis 1 and it has a rotationally symmetric configuration with respect to the center axis 1.

And, as can be seen from FIG. 16 in particular, a plurality of subordinate optical systems 3 of identical construction are juxtaposed (located side by side) on a circumference concentric about the center axis 1. For each subordinate optical system 3, too, not only is a single refractive unit used, but any of a catoptric system, catadioptric system and a combined optical system is also usable; that is, the requirement is that it has positive or negative power, and when combined with the main optical system 2, a stop located in the subordinate optical system 3—a stop defined by an aperture around the first surface of the subordinate optical system 3 that faces the main optical system 2—is such that an exit pupil 4 that is an image of that stop through the main optical system 2 is formed far away from the subordinate optical system 3 via the center axis 1. Because the plurality of subordinate optical systems 3 of identical construction are juxtaposed on the circumference concentric about the center axis 1, the exit pupils 4 of the respective combined optical systems are located side by side concentrically about the center axis 1. The sizes of the respective exit pupils 4 are determined such that when located side by side, they are stitched together on that circumference in a substantially back-to-back relation.

And then, there is the display plane 5 of a display device located at a position that is on the side of each subordinate optical system 3 facing away from the main optical system 2 and conjugate to the center axis 1 of the combined optical system built up of the main optical system 2 and the subordinate optical system 3. Accordingly, an enlarged image 6 on the display plane 5 is formed near the center axis 1. In the embodiment of FIGS. 13 through 16, it is formed as a virtual image.

The arrangement being like this, as the viewer brings his eye near the position of any of exit pupils 4, he will be able to view as an enlarged image 6 a real image itself formed by that combined optical system on the display plane 5 located at the image plane of the combined optical system (the main optical system 2 and subordinate optical system 3) and near the center axis 1 or, alternatively, a virtual image of that real image formed by an optical portion of the main optical system 2 on a viewing side with respect to the center axis 1 (the virtual image in Example 1, and the real image itself in Example 2, 3). And then, the combined optical systems, each built up of the main optical system 2 and the subordinate optical system 3, are taken as being equal to an arrangement where they are arranged at constant angles about the center axis 1. With the center axis 1 set as the vertical direction, accordingly, the viewer will be able to view the enlarged image 6 of the image displayed on the display plane 5 (facing away from the exit pupil 4 via the center axis 1) at a position corresponding to the exit pupil 4 at which the viewer's eye is positioned, even as viewed from any of the 360-degree directions around the center axis 1.

Referring here to the center axis 1 set as the vertical direction, it is of importance that the subordinate optical systems 3 are located below the horizontal viewing direction, so that they do not stand in the way upon viewing from that horizontal direction. For instance, in the simplest arrangement, the viewing direction and the height of the display plane 5 lie in the same plane; however, the display plane 5 lying on the opposite side (viewing side) via the center axis 1 gets in the way, rendering it impossible to view an observation image. Therefore, if there is an arrangement wherein the subordinate optical systems 3 are located below the viewing direction and, at the same time, an image on the small display plane 5 is enlarged and projected by the subordinate optical system 3 onto the main optical system 2 where it is formed as an enlarged image, it is then possible to display a large image (enlarged image) 6 on the small display plane 5 while the display device having the display plane 5 does not stand in the way.

Further, the plurality of the same subordinate optical systems 3 are concentrically located, and their apertures (stops) are juxtaposed concentrically about the center axis 1. The apertures (stops) located concentrically and side by side are enlarged and projected by the main optical system 2 onto an area to be viewed by the viewer, and the exit pupils 4 are juxtaposed concentrically about the center axis 1 in a substantially back-to-back relation, so that there can be a wide viewing area achieved. With the exit pupils 4 juxtaposed and projected continuously, it is possible to make sure a wide enough viewing area without recourse of a diffuser or the like. Further, the image on the display plane 5 is enlarged by the subordinate optical system 3, and then enlarged and projected by the main optical system 2 onto the vicinity of the center axis 1. The viewer is supposed to view such enlarged and projected image 6; the viewer can view a large image.

Further, with the enlarged image 6 located near the center axis 1, it is possible to bring the vergence of the observation image 6 projected by at least two combined optical systems in alignment with the vergence point of both eyes; it is possible to provide a stereoscopic display capable of fusion.

More preferably, it is desired for each display plane 5 to display images taken of the same object from a plurality of points of view. For instance, when the full 360-degree circumference of an object 100 is divided into 16 segments, its parallactic image may comprise still images taken by a camera 101 in 22.5° segments, or moving images generated from a CG-generated 3D object or the like at points of view in 22.5° segments. Alternatively, moving images obtained from an imaging apparatus with 16 cameras directed to the center point may be used, too.

Figure 1:
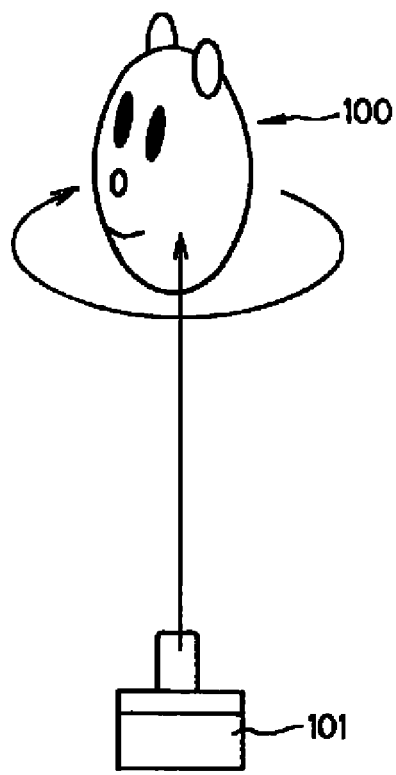
FIG. 1 is illustrative of how to take a parallactic image located on the display surface of the optical system in the inventive visual display apparatus.
Figure 2:
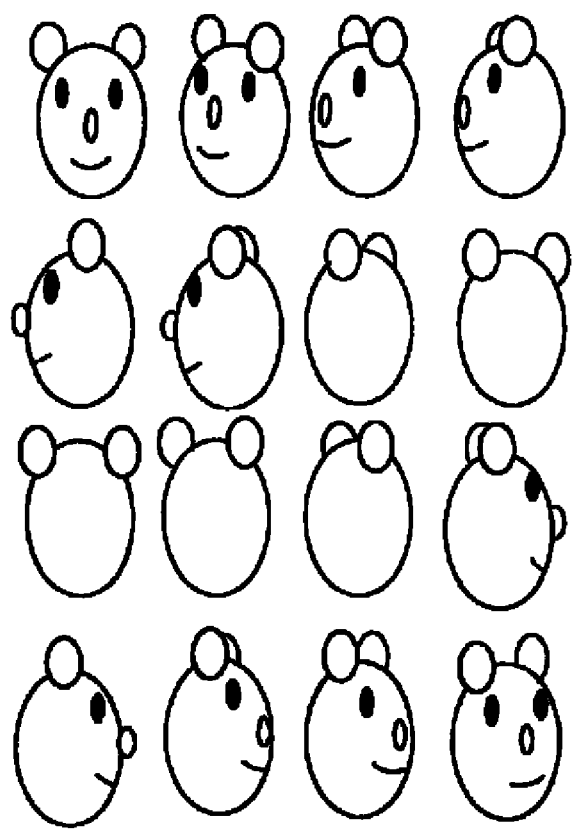
FIG. 2 is illustrative of an example of the parallactic image taken by the method of FIG. 1.
Figure 3:
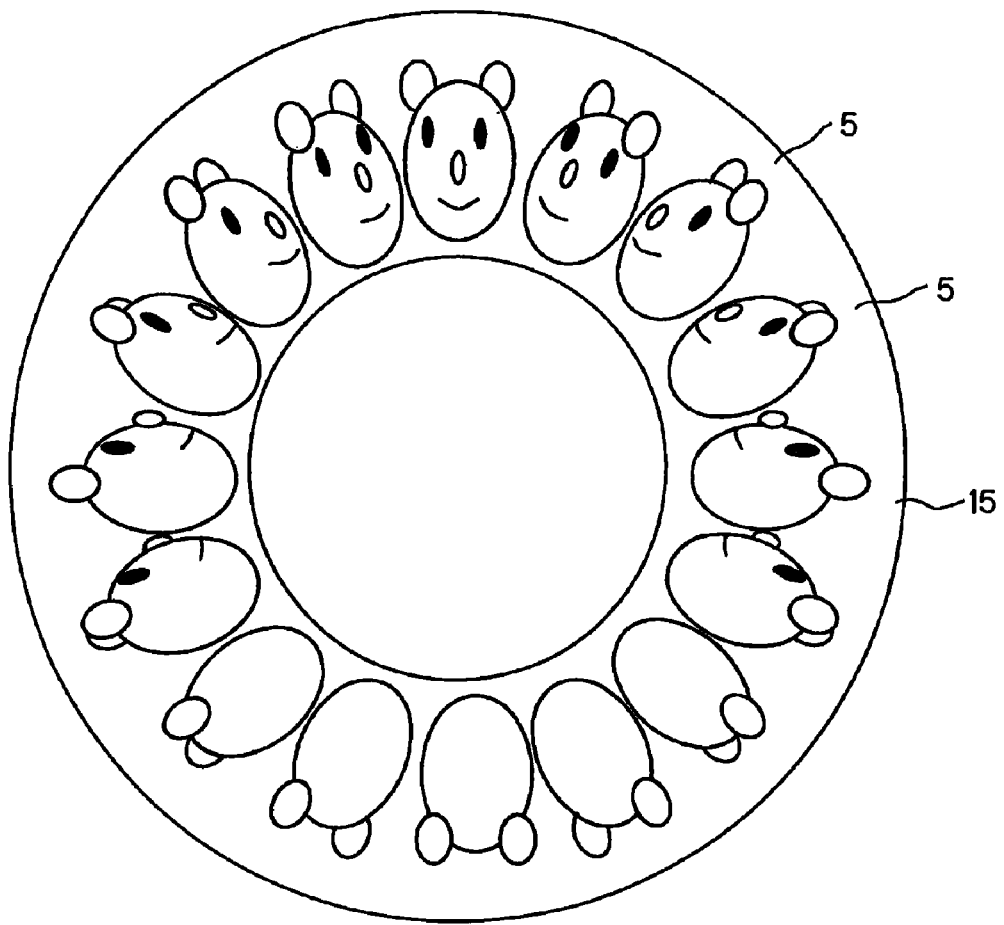
FIG. 3 is illustrative of how to display a parallactic image on the whole conical display surface.
Figure 4:
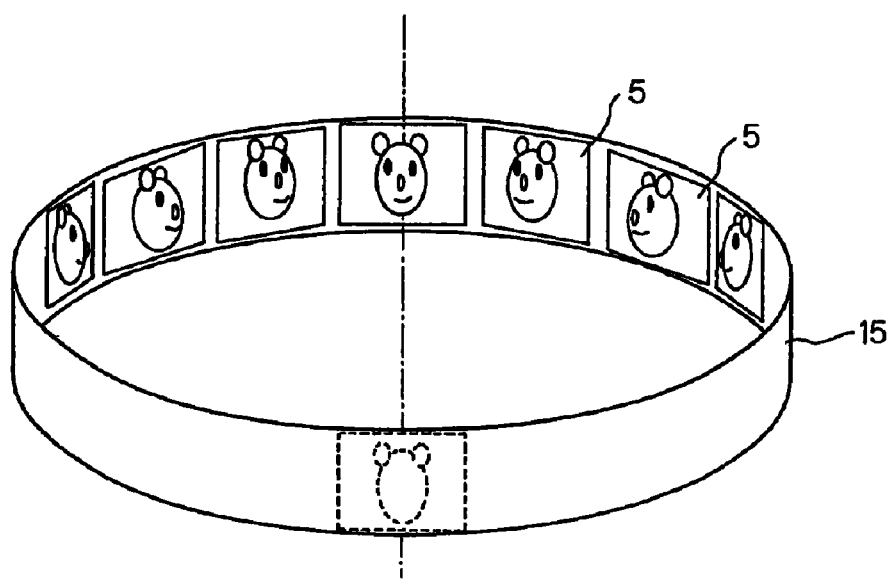
FIG. 4 is illustrative of how to display a parallactic image on the whole cylindrical display surface.

The thus prepared still or moving images having 16 points of view provide 16 points-of-view images, as shown in FIG. 2 where 16 images of object 100 are lined up in order. When the whole display surface (display devices) 15 is in a conical form, they are displayed concentrically and conically according to the order of the taken segments, as shown in FIG. 3. In actual applications, they must be displayed in advance while flipped vertically and horizontally, because they are flipped vertically and horizontally due to the formation of images by the combined optical systems. When the whole display surface (display devices) 15 is in a cylindrical form, they are displayed cylindrically according to the order of the taken segments.

Figure 5:
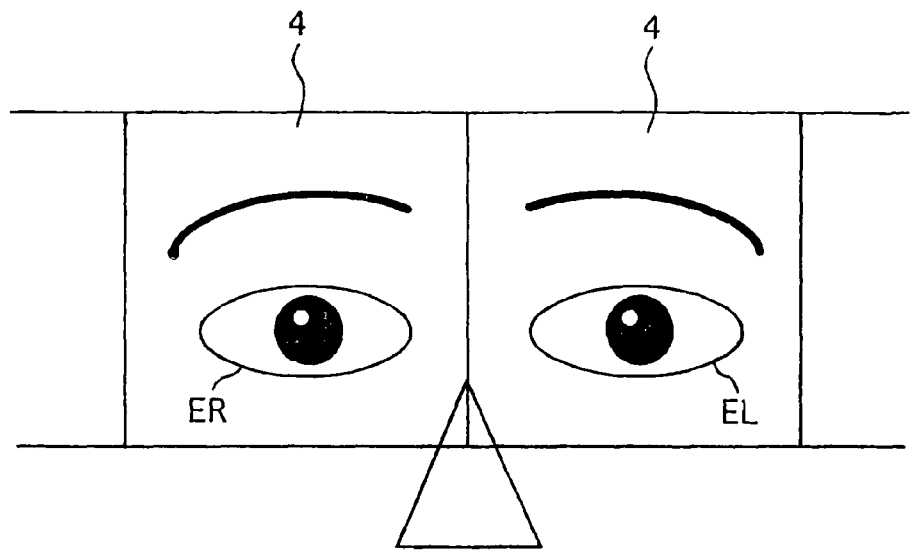
FIG. 5 is illustrative of how the left and right eyeballs of a viewer are positioned on adjacent exit pupils of the optical system of the inventive visual display apparatus.
Figure 6:
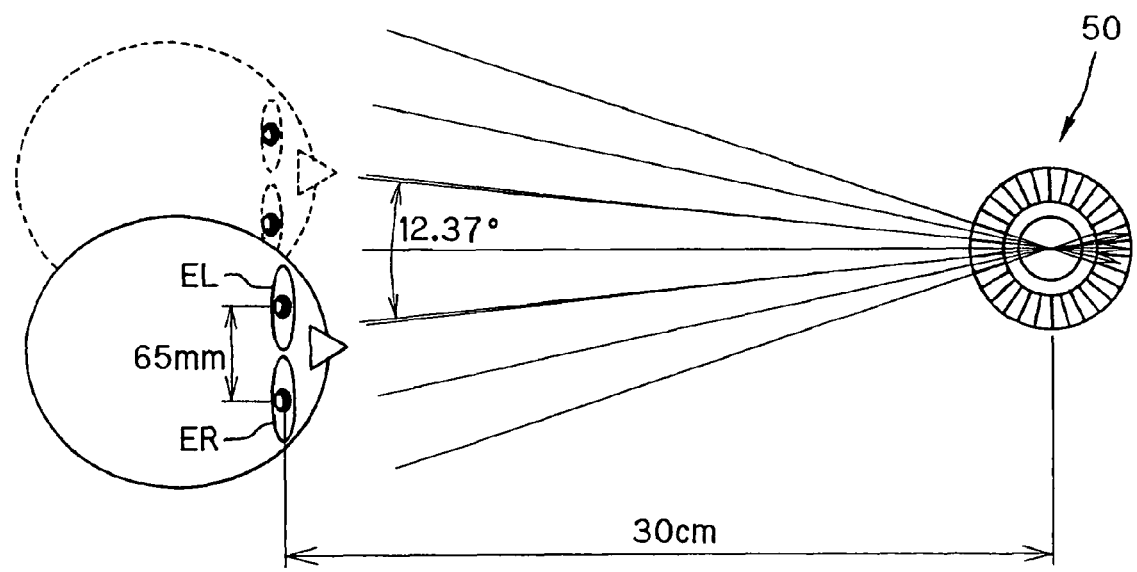
FIG. 6 is illustrative of a space between the inter-pupillary distance of the left and right eyeballs of a viewer and adjacent exit pupils of the optical system of the inventive visual display apparatus.

With such parallactic images located on the display planes 5 around the center axis according to the order of the taken segments and the viewer's left and right eyeballs EL and ER positioned at adjacent exit pupils 4 as shown in FIG. 5, the enlarged image 6 of a binocular parallactic image will be visible to the left and right eyeballs EL and ER; the stereoscopic image of the taken object 100 will be visible to them.

Referring here to the positions of the exit pupil 4 on which the stop of the subordinate optical system 3 is projected at the viewing position and the viewer's left and right eyeballs EL and ER, it is desired that the spacing of the projected exit pupils 4 of the optical system 50 in the inventive visual display apparatus is at least 65 mm because the standard interpupillary distance is 65 mm. While it is shown in FIG. 5 that the exit pupil 4 is of a square shape, it is contemplated that it may have an oval or rectangular form.

Figure 7:
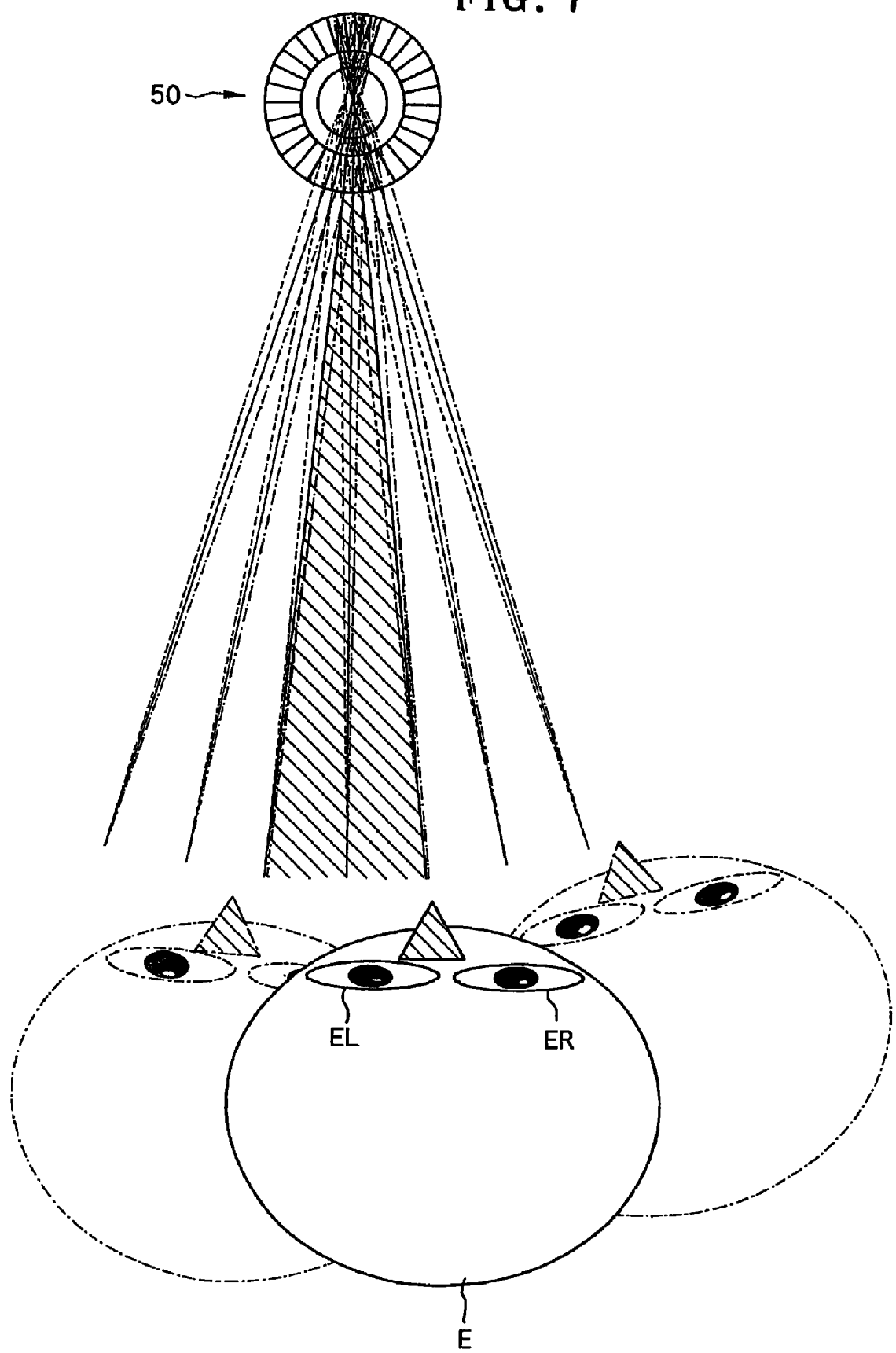
FIG. 7 illustrates that when a viewer moves his head, how the head moves sequentially to a viewing area defined by the next combined optical system.

Assume here that the viewing position is 30 cm—distance of distinct vision—away from the optical system 50. It is then preferable that the area viewed by one combined optical system in the optical system 50 in the inventive visual display apparatus is greater than 12.370 because the standard interpupillary distance is 65 mm. Further, as the viewer E moves his head, it causes the head to move to the next area by the next combined optical system, as shown in FIG. 7; eventually, the viewer will be able to view a stereoscopic image from the full 360-degree directions. Further, it is possible to view stereoscopic images in the full directions by the mechanical rotation of the optical system 50, or it is possible to view stereoscopic images from the full directions by the electronic changing of images displayed on the display planes 5.

It is here understood that instead of the parallactic images arranged in the order of segment as described above, for instance, images that change to quite different ones at a critical angle may be used as the images located at the display planes 5, so that different images can be viewed depending on what angle they are viewed at or who views them.

Figure 8:
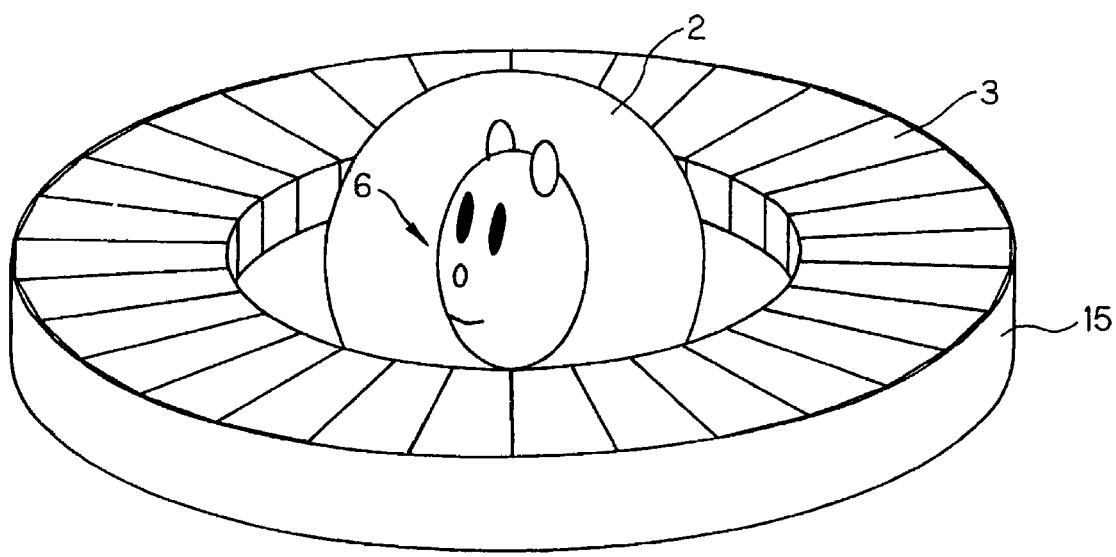
FIG. 8 is illustrative in schematic of the main optical systems, subordinate optical systems, display planes (display devices), and enlarged image in the inventive visual display apparatus.

One schematic view of the main optical system 2, subordinate optical systems 3, display surface (display devices) 15 and enlarged image 6 is presented in FIG. 8.

More preferably, the display planes 5 are each formed of a plurality of planar display devices that are located in a rotationally symmetric configuration. It is thus possible to use generally available display devices to set up each display plane 5 with no need of fabricating new, special display devices, thereby setting up a visual display apparatus at low costs.

More preferably, the display plane 5 should be set up with the use of a three-dimensional display device obtained by rounding off a two-dimensional display device. In recent years, there have been display devices available, for instance, display devices such as LCDs or organic EL devices formed on a flexible substrate. If these flexible two-dimensional display devices are rounded off so as to use them as the display planes 5, it is then possible to provide concentrically and three-dimensionally located display devices at low costs.

It is also desired that at least one surface of the main optical system 2 is configured in such a way as to have different curvatures between a longitudinal section including the axis of rotational symmetry (center axis) 1 and a cross section orthogonal to the axis of rotational symmetry 1. The visual display apparatus of the invention is an omnidirectional optical system where an image display area and a viewing area are disposed with an axis of rotational symmetry located between them. Accordingly, as the image display area and the viewing area are located within one plane, an observation image is out of sight at the image display area. To avoid this, it is required that a light beam arriving at the viewing area from the image display area lies oblique with respect to the axis of rotational symmetry 1 of the main optical system 2. This in turn requires that the subordinate optical systems 3 are decentered with respect to the axis of rotational symmetry 1 of the main optical system 2, ending up with the occurrence of decentration aberrations. To reduce or correct such aberrations, at least one surface of the main optical system 2 should be configured in such a way as to have different curvatures between a longitudinal section including the axis of rotational symmetry (center axis) 1 and a cross section orthogonal to the axis of rotational symmetry 1.

More preferably, at least one surface of the main optical system 2 should assume on a rotationally symmetric shape defined by the rotation about the axis of rotational symmetry 1 of a curve of any desired shape having no plane of symmetry, because it is possible to make correction of decentration aberrations, for instance, coma produced by decentration.

More preferably, at least one surface of the main optical system 2 should assume on a rotationally symmetric shape defined by the rotation about the axis of rotational symmetry 1 of a curve of any desired shape including an odd-numbered term, because it is possible to make correction of aberrations with a free flexibility.

It is more desirous for the main optical system 2 to satisfy the following condition:

$$10 \text{ mm} < Rs \quad (2)$$

Here Rs is half the outside diameter of the main optical system 2 (in a direction orthogonal to the axis of rotational symmetry 1). As the lower limit of 10 mm is not reached, an observation image will become too small to add a sense of realism.

The values of Rs in Examples 1-3, given later, are set out.

| | Example | | |
|---|---|---|---|
| | 1 | 2 | 3 |
| Rs (mm) | 15.00 | 30.00 | 27.43 |

Figure 9A:
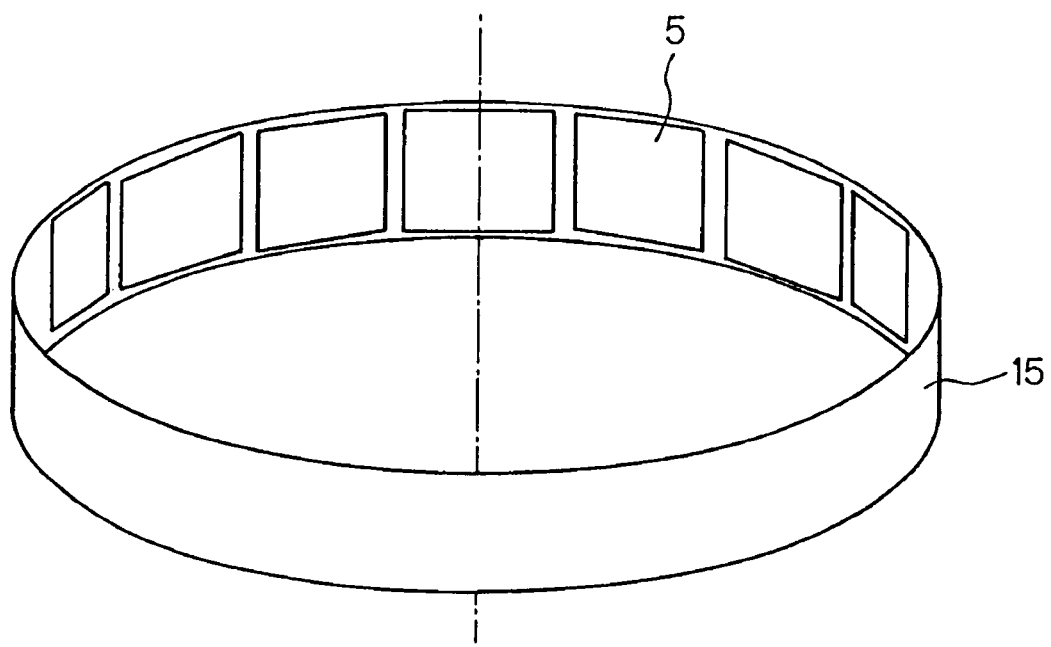
FIG. 9 is illustrative of the whole cylindrical display surface (display devices) with the respective display planes located inside (a), and outside (b).
Figure 9B:
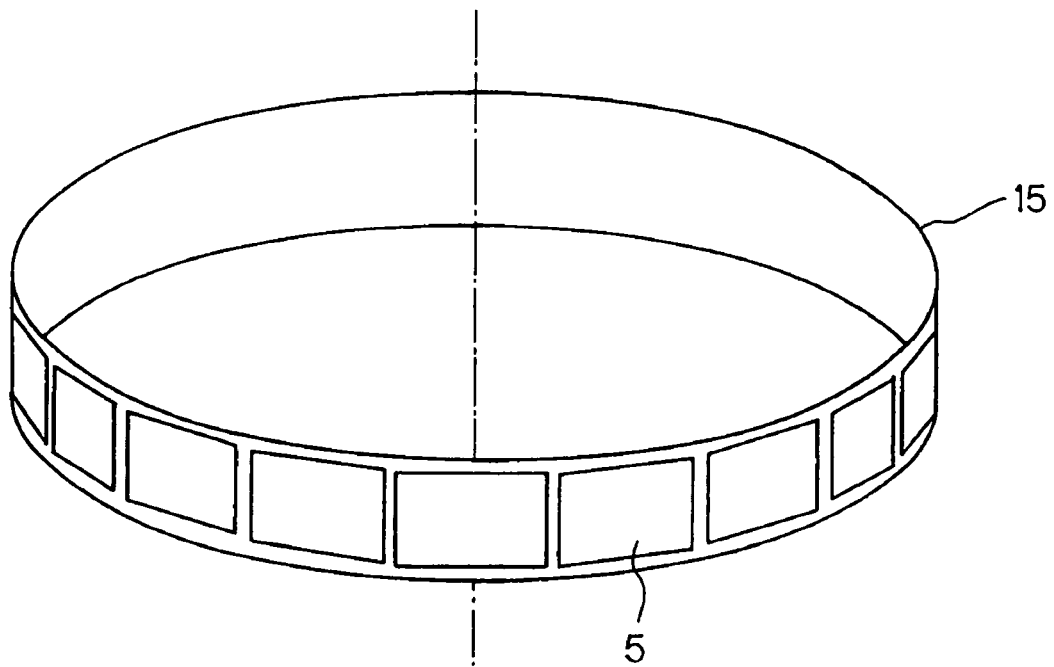

Referring further to the visual display apparatus of the invention, there is the display plane 5 provided corresponding to each subordinate optical system 3. The whole display surface 15 built up of the juxtaposed display planes 5 assumes on a cylindrical or conical configuration, as described above. Such a cylindrical or conical display surface may be made up of one single display device, or a plurality of planar display devices that are located in a rotationally symmetric configuration. In either case, the display planes 5 may be located on the inside or the outside of that cylindrical or conical surface. FIG. 9 is illustrative of one example of the whole display surface (display devices) 15 in a cylindrical form; FIG. 9(a) is illustrative of the display planes located inside, and FIG. 9(b) is illustrative of the display planes located outside.

Figure 10:
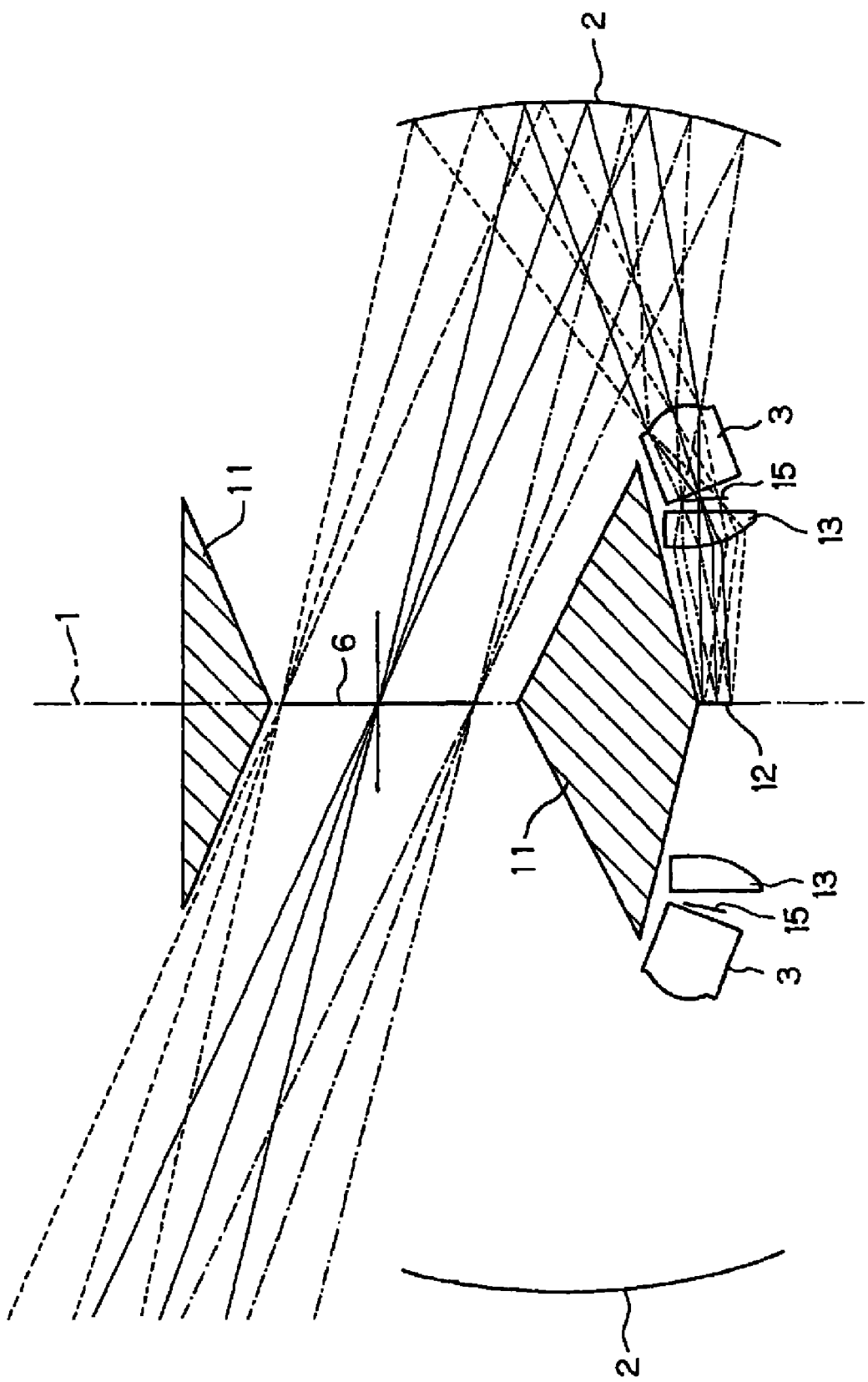
FIG. 10 is illustrative of an embodiment wherein there is a light block member located in an area of the optical system in the visual display apparatus of the invention, through which light rays do not transmit.

Desirously in the visual display apparatus of the invention, there is a light block member located in an area of the rotationally symmetric optical system through which light rays do not transmit. FIG. 10 is a sectional view of one example as taken along the center axis 1, and there is also an illumination unit comprising a linear light source 12 and a condensing optical system 13, wherein the illumination unit is adapted to illuminate the stereoscopically located whole display surface 15 from every direction. In this example, a light block member 11 adapted to limit display light from the main optical system 2 comprising a rotationally symmetric reflecting mirror and a light block member 11 adapted to limit illumination light arriving at the display devices 15 and the subordinate optical systems 3 from the linear light source 12 via the condensing optical system 13 are located symmetrically about the center axis 1, as shown.

Referring further to FIG. 10, the illumination unit is built up of the linear light source 12 located along the center axis 1 and the ring-form condensing optical system 13 located behind the cylindrical display surface 15, having positive power in a section including the center axis 1 and decentered rotationally symmetric about the center axis 1. Illumination light coming out of one point of the linear light source 12 in the section including the center axis 1 illuminates the display surface 15 substantially parallel, providing consistent Köhler illumination. In addition, the illumination light coming out of the linear light source 12 is limited to within the section including the center axis 1, and there is no light in the sagittal section; there is no light responsible for flares, making it possible to view an consistent enlarged image of good contrast.

Figure 11:
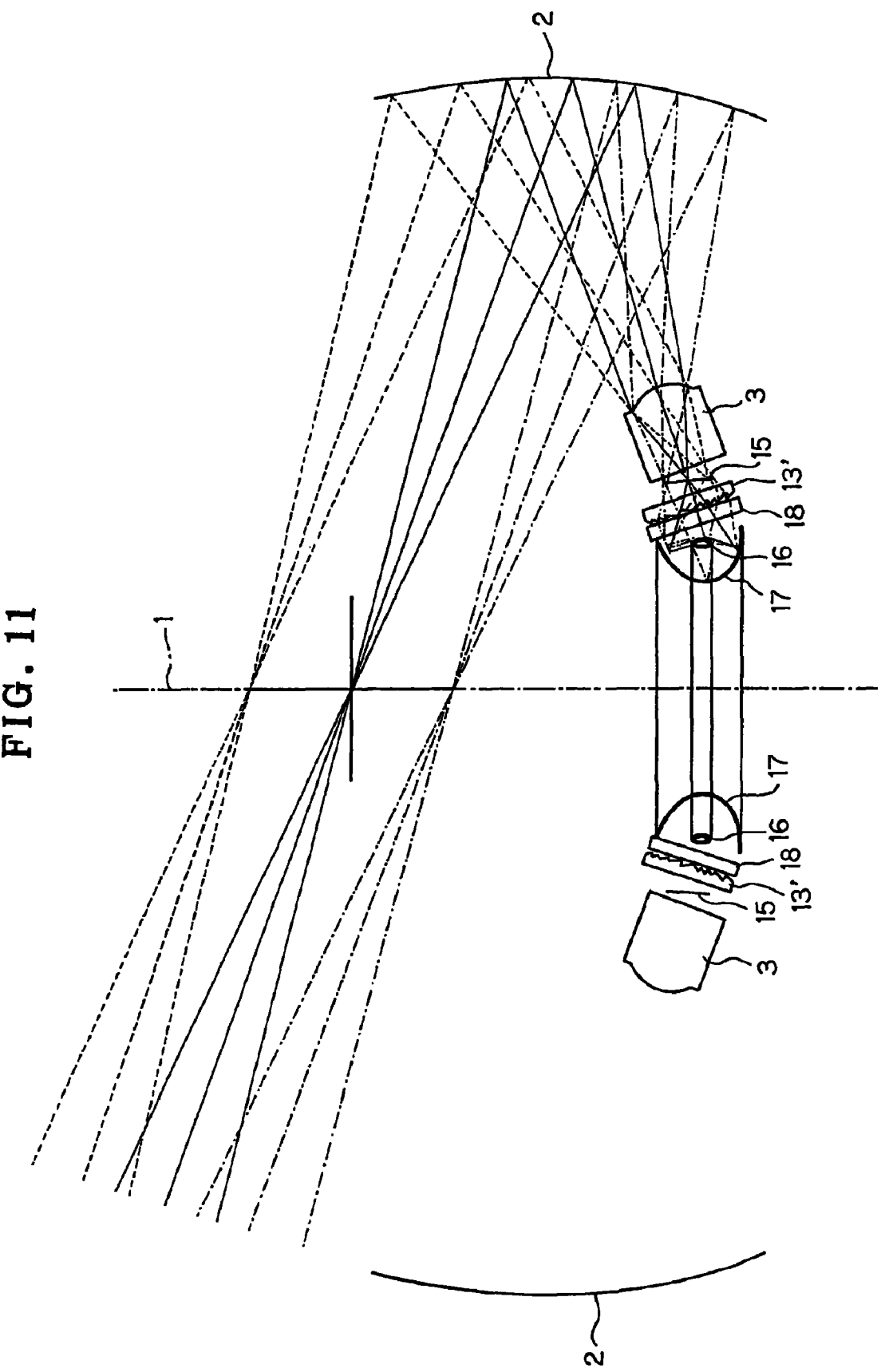
FIG. 11 is illustrative in section of one embodiment of the illumination unit used with the visual display apparatus of the invention.

FIG. 11 is illustrative of one example wherein a light emitter 16 in a circular ring form about the center axis 1 is used as the illumination unit. To be more specific, a ring-form reflecting mirror 17 adapted to focus illumination light radiated from that ring-form light emitter 16 toward the display device 15 in a section including the center axis 1 is located inside of the ring-form light emitter 16 about the center axis 1, and a ring-form condensing optical system 13', which assumes on a Fresnel shape of positive power in a section including the center axis 1 and is rotationally symmetric about the center axis 1 is located around the ring-form light emitter 16 about the center axis 1 to focus light on, and illuminate, the cylindrical display device 15 from within. And then, it is preferable that means such as a angle-of-field limiting filter or louver 18 is located between the ring-form light emitter 16 and the display plane 15 in such a way as to limit light rays leaving the display plane 15 to within the section including the center axis 1, thereby enhancing the contrast of an observation image.

Figure 12:
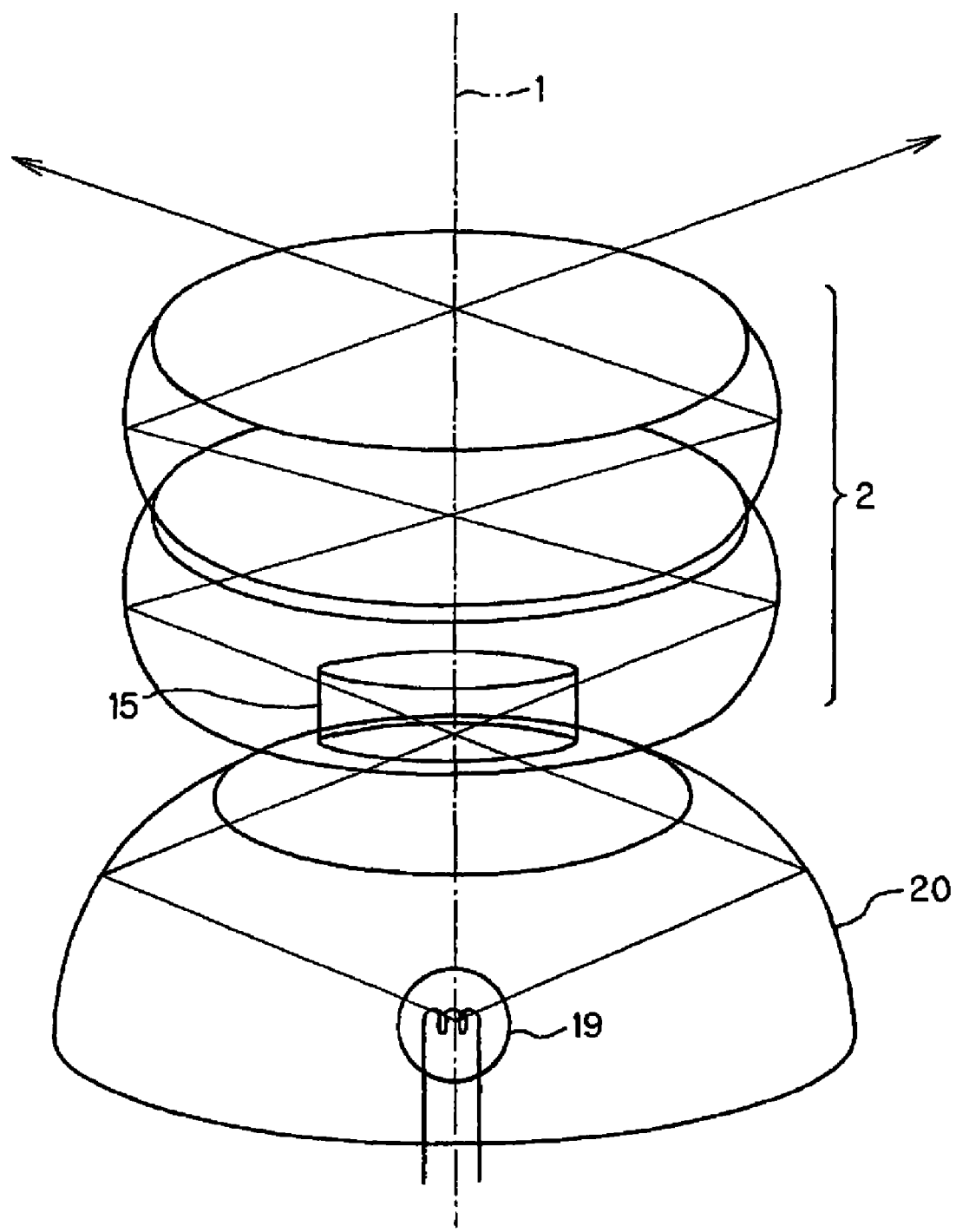
FIG. 12 is illustrative in perspective of another embodiment of the illumination unit used with the visual display apparatus of the invention.

It is here noted that the illumination light coming out of the point on the center axis 1 is limited to within the meridional section (a section including the center axis 1). Therefore, if, as shown in FIG. 12, a point light source 19 is located on one point on the center axis 1, around the point light source 19 there is a ring-form reflecting mirror 20 located, which is adapted to focus light radiated from the point light source 19 on another point on the center axis 1 and is concentric and rotationally symmetric about the center axis 1, and the display device 15 is located in its reflection optical path to set up an illumination unit, it is then possible to illuminate the display device 15 only with the use of illumination light limited to within the meridional section as is the case with FIG. 10 and, hence, view an image of good contrast. Although the subordinate optical systems are not shown in FIG. 12, the main optical system 2 is built up of two ring-form reflecting mirrors located along the center axis 1.

The invention is now explained with reference to Examples 1, 2 and 3 of the optical system in the visual display apparatus. Constituting parameters concerning these optical systems will be given later. Note here that such constituting parameters in these examples are figured out based on the results of back ray tracing, where an object plane provides a plane for the enlarged image 6, an image plane conjugate to the enlarged image 6 provides the display plane 5, and light rays traveling from the object plane 6 toward the image plane 5 through the exit pupil 4 (also through the exit pupil 4 when extended in the opposite) arrives at the image plane 5 via the optical surfaces 21, 22 of the main optical system 2, a stop plane and the optical surfaces 31, 32 of the subordinate optical system 3.

Referring to a coordinate system on back ray tracing, the origin of a decentered optical surface in a decentered optical system is defined by the center of the object plane 6 (positioned above the center axis 1), the Y-axis positive direction is defined by a direction of the center axis 1 facing away from the image plane 5, and the Y-Z plane is defined by the drawing sheet, as shown typically in FIG. 14. And then, the Z-axis positive direction is defined by a direction of the side of the image plane 5 of FIG. 14, and the X-axis positive direction is defined by an axis that forms with the Y- and Z-axes a right-handed orthogonal coordinate system.

For a decentered surface are the amount of decentration from the center of the origin of the aforesaid optical system on a coordinate system on which that surface is defined (X, Y and Z are indicative of the X-axis direction, the Y-axis direction, and the Z-axis direction, respectively), and the angles of tilt ($\alpha$, $\beta$, $\gamma$ (°)) of the coordinate systems for defining the surfaces with the centers on the X-, Y- and Z-axes, respectively. In that case, the positive signs for $\alpha$ and $\beta$ mean counterclockwise rotation with respect to the positive directions of the respective axes, and the positive sign for $\gamma$ means clockwise rotation with respect to the positive direction of the Z-axis. Referring here to how to perform $\alpha$-, $\beta$- and $\gamma$-rotations of the center axis of the surface, the coordinate system that defines each surface is first $\alpha$-rotated counterclockwise about the X-axis of the coordinate system that is defined at the origin of the optical system. Then, the coordinate system is $\beta$-rotated counterclockwise about the Y-axis of the rotated new coordinate system. Finally, the coordinate system is $\gamma$-rotated clockwise about the Z-axis of the rotated new another coordinate system.

When, of optical surfaces forming the optical system of each example, a specific surface and the subsequent surface form together a coaxial optical system, there is a surface spacing given. Besides, the radius of curvature of each surface and the refractive index and Abbe number of the medium are given according to common practices.

The extended rotation free-form surface here is a rotationally symmetric surface given by the following definition.

First, there is the following curve (d) given, passing on a Y-Z coordinate plane through its origin.

$$Z = (Y^2/RY)/\left[1 + \{1 - (C_1+1)Y^2/RY^2\}^{1/2}\right]C_2Y + C_3Y^2 + \qquad (b)$$
$$C_4Y^3 + C_5Y^4 + C_6Y^5 + C_7Y^6 + \ldots + C_{21}Y^{20} + \ldots + C_{n+1}Y^n + \ldots$$

Then, there is a curve F(Y) given, where the curve (d) is rotated by an angle $\theta$ (°) with anticlockwise rotation defined as positive relative to the X-axis positive direction. This curve F(Y), too, passes on the Y-Z coordinate plane through the origin.

That curve F(Y) is parallel translated by a distance R in the Z-positive direction (in the Z-negative direction in the case of a negative sign), and the parallel translated curve is then rotated about the Y-axis. The thus obtained rotationally symmetric surface gives an extended rotation free-from surface.

As a consequence, the extended rotation free-form surface provides a free-form surface (smooth curve) in the Y-Z plane, and a circle with a radius |R| in the X-Z plane.

From this definition, the Y-axis becomes the axis of the extended rotation free-form surface.

Here, RY is the radius of curvature of a spherical term in the Y-Z section, $C_1$ is a conical constant, and $C_2$, $C_3$, $C_4$, $C_5$, ... are the first-, second-, third- and fourth-order aspheric coefficients, respectively.

Note here that a conical surface with an axis parallel with the Y-axis as a center axis is given as one of the extended rotation free-form surface, where RY=∞, $C_1$, $C_2$, $C_3$, $C_4$, $C_5$, ... 0, $\theta$=(angle of inclination of the conical surface, and R=(radius of the base in the X-Z plane).

It is also noted that the term with respect to aspheric surfaces on which no data are mentioned in the constituting parameters, given later, is zero. Refractive indices and Abbe numbers are given on a d-line (587.56 nm wavelength) basis, and length in mm. The decentration of each surface is given in terms of the amount of decentration from the reference surface.

Figure 17:
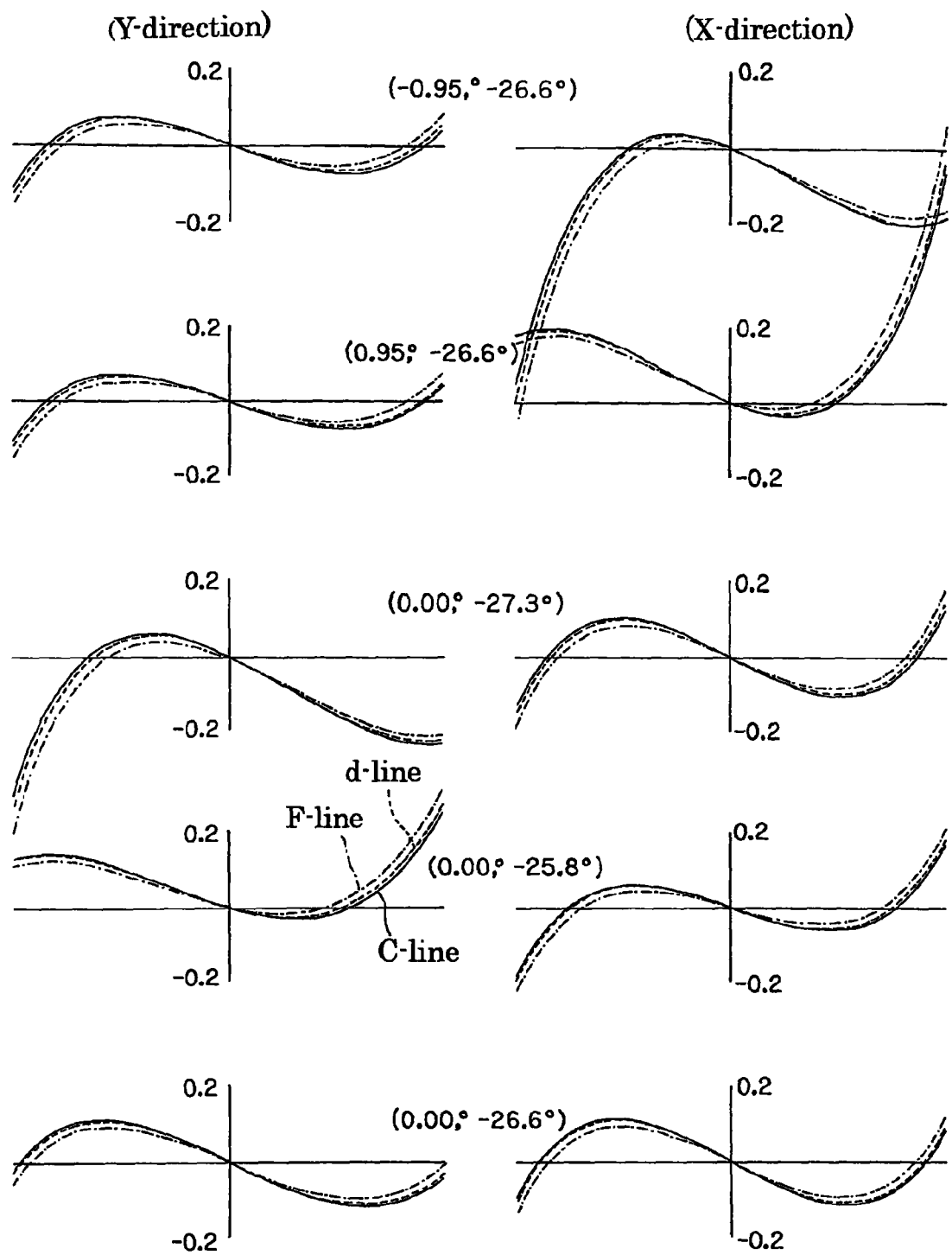
FIG. 17 is an aberration diagram for the whole optical system of Example 1.

Example 1 is now given. FIG. 13(a) is a sectional view of the optical system in the visual display apparatus of Example 1 as taken along the center axis 1; FIG. 13(b) is a plan view of an optical path through that optical system as viewed in a direction along the center axis 1; FIG. 14 is an enlarged view of part of FIG. 13(a); FIG. 15 is an enlarged view of part of FIG. 13(b); and FIG. 16 is a plan view of the whole optical system as viewed in a direction along the center axis. Throughout FIGS. 13-15, it is noted that only some of the subordinate optical systems 3 and display planes 5 are shown. FIG. 17 is a transverse aberration diagram for the whole optical system according to this example. In the transverse aberration diagram, the angles at the middle are indicative of the (angles of view in the horizontal and vertical directions, respectively), and there are transverse aberrations indicated at those angles of view in the Y (meridional) and X (sagittal) directions, respectively. Throughout the disclosure, the minus sign for the angle of view would mean a clockwise angle in the Y-axis positive direction for the horizontal angle of view, and a clockwise angle in the X-axis positive direction for the vertical angle of view.

In Example 1, the main optical system 2 is made up of a ball unit (ball lens) having its center positioned on the center axis 1 and positive power rotationally symmetric about the center axis 1, and 30 subordinate optical systems 3 of the same construction juxtaposed on a circumference concentric about the center axis 1 are each made up of a planoconvex positive lens with a plane on its image plane 5 side. A stop is defined by an aperture around the first surface 31 of each subordinate optical system 3 that faces the main optical system 2, and an image of that stop by the main optical system 2 defines an exit pupil 4 on a side far away from each subordinate optical system 3 via the center axis 1. With thirty subordinate optical systems 3 of the same construction juxtaposed on the circumference concentric about the center axis 1, the exit pupils 4 of combined optical systems consisting of the main optical system 2 and the respective subordinate optical systems 3 are placed in concentric juxtaposition about the center axis 1. And then, the respective exit pupils 4 are sized such that when placed in juxtaposition, they are stitched together on that circumference in a substantially back-to-back relation.

The display plane 5 is located at a position that faces the second surface 32 of each subordinate optical system 3 and conjugate to the position of the center axis 1, and a real image on that display plane 5 is formed near the center axis 1 by the combined power of the positive power of the subordinate optical system 3 (the combined refracting power of the second 32 and the first surface 31) and the positive power of the second surface 22 of the main optical system 2. And then, that real image is similarly formed as an enlarged virtual image 6 positioned near the optical axis 1 via the first surface 21 of the main optical system 2; that virtual image can be viewed from the side far away from the display plane 5 via the center axis 1.

The arrangement being like this, as the viewer brings his eye near any of the exit pupils 4, he will be able to view the enlarged image 6 that is formed on the display plane 5 located on the image plane of the combined optical system (main 2 and subordinate optical system 3) to define that exit pupil 4, and near the center axis 1. And, there are twelve combined optical systems, each consisting of the main 2 and the subordinate optical system 3, located in 12° segments about the center axis 1. Therefore, as the center axis 1 is set as the vertical direction, it will enable the viewer to view the enlarged image 6 of the image displayed on the display plane 5 (that is opposite to that exit pupil 4 with the center axis 1 located between them) at a position corresponding to the exit pupil 4 at which the viewer's eye is positioned even in any of the full 360-degree directions about the center axis 1.

While it is shown and described that the display planes 5 are each in a planar form, it is contemplated that the whole display surface is configured into a truncated cone. While that whole display surface may be set up with the use of one single display device, it is understood that it may be constructed of thirty planar display devices located on the respective sides of a truncated cone (30-angular pyramid) in a rotationally symmetric way.

Figure 18:
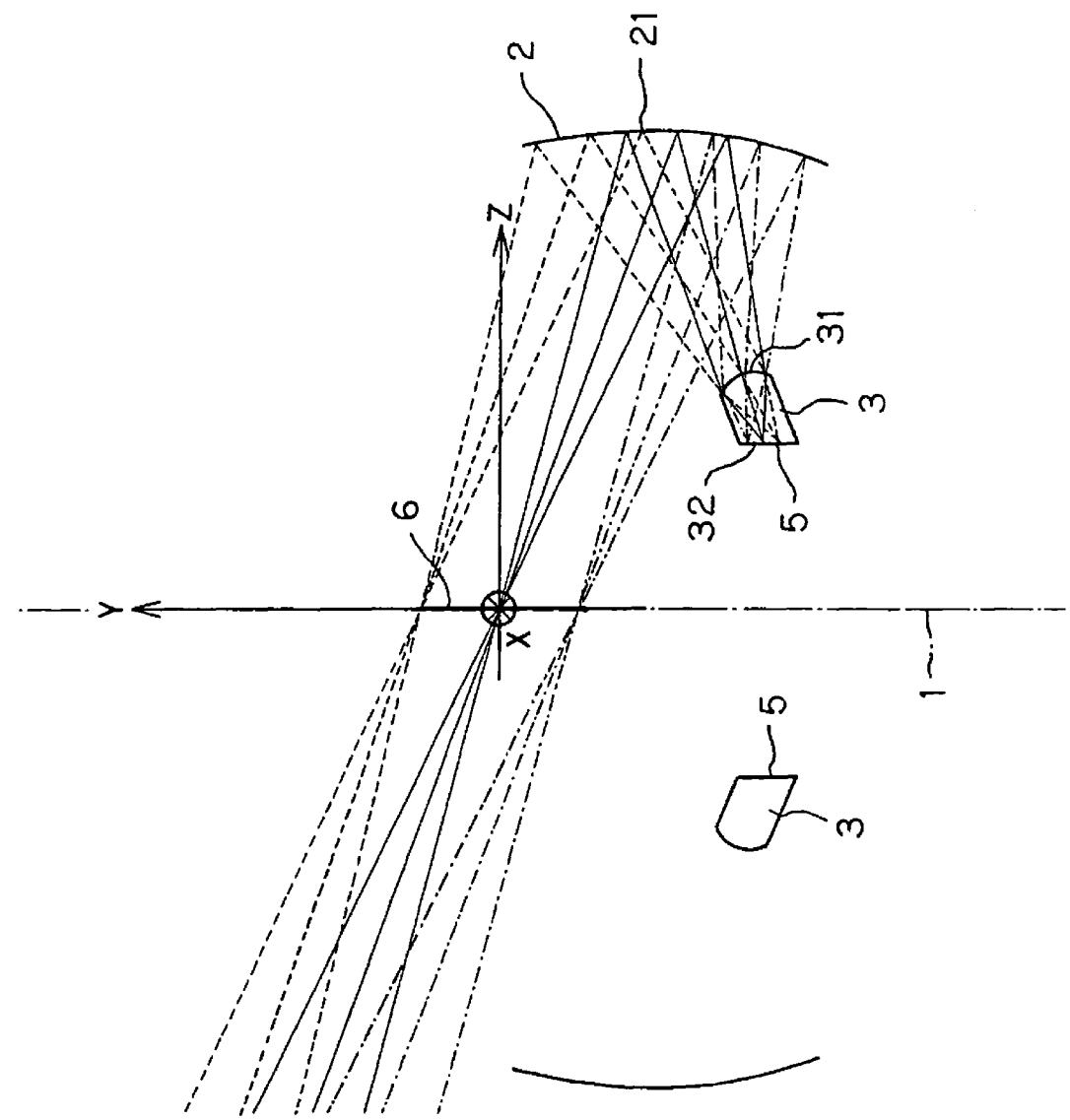
FIG. 18 is a sectional view of the visual display apparatus according to Example 2 of the invention as taken along its main part.
Figure 19:
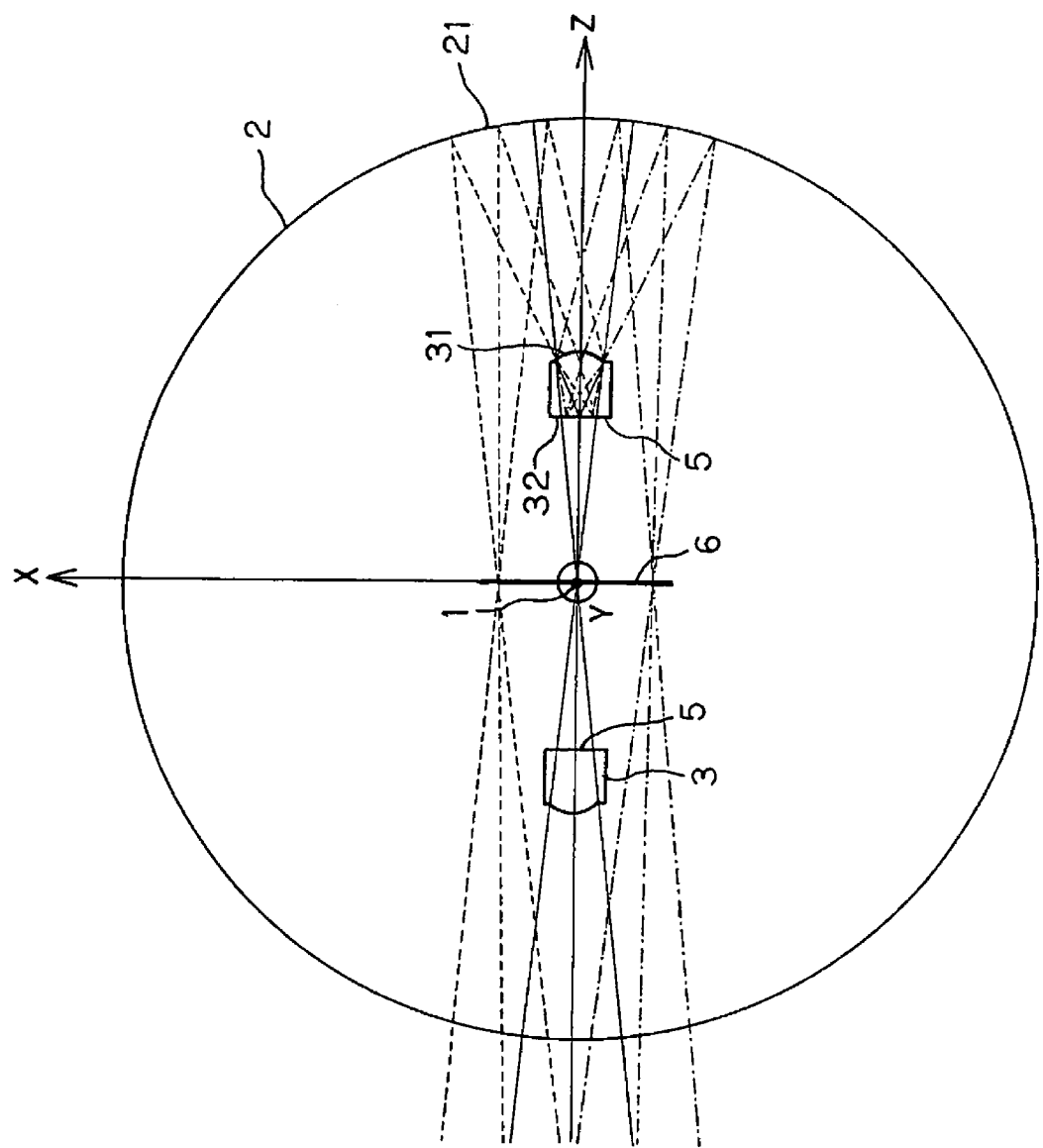
FIG. 19 is a plan view of an optical path through the optical system of part of FIG. 18, as viewed in a direction along the center axis.
Figure 20:
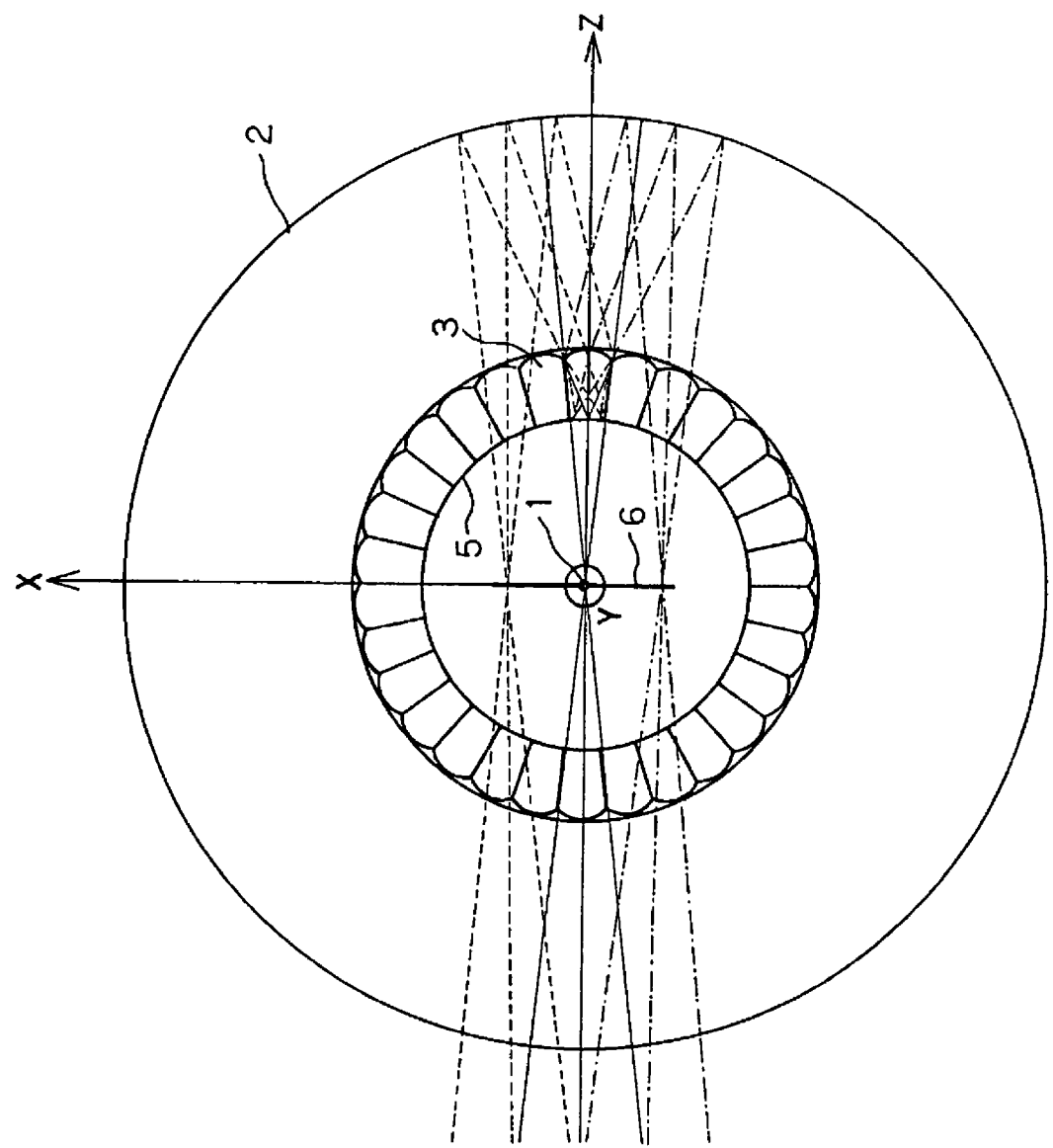
FIG. 20 is a plan view of whole optical system of Example 2, as viewed in a direction along the center axis.
Figure 21:
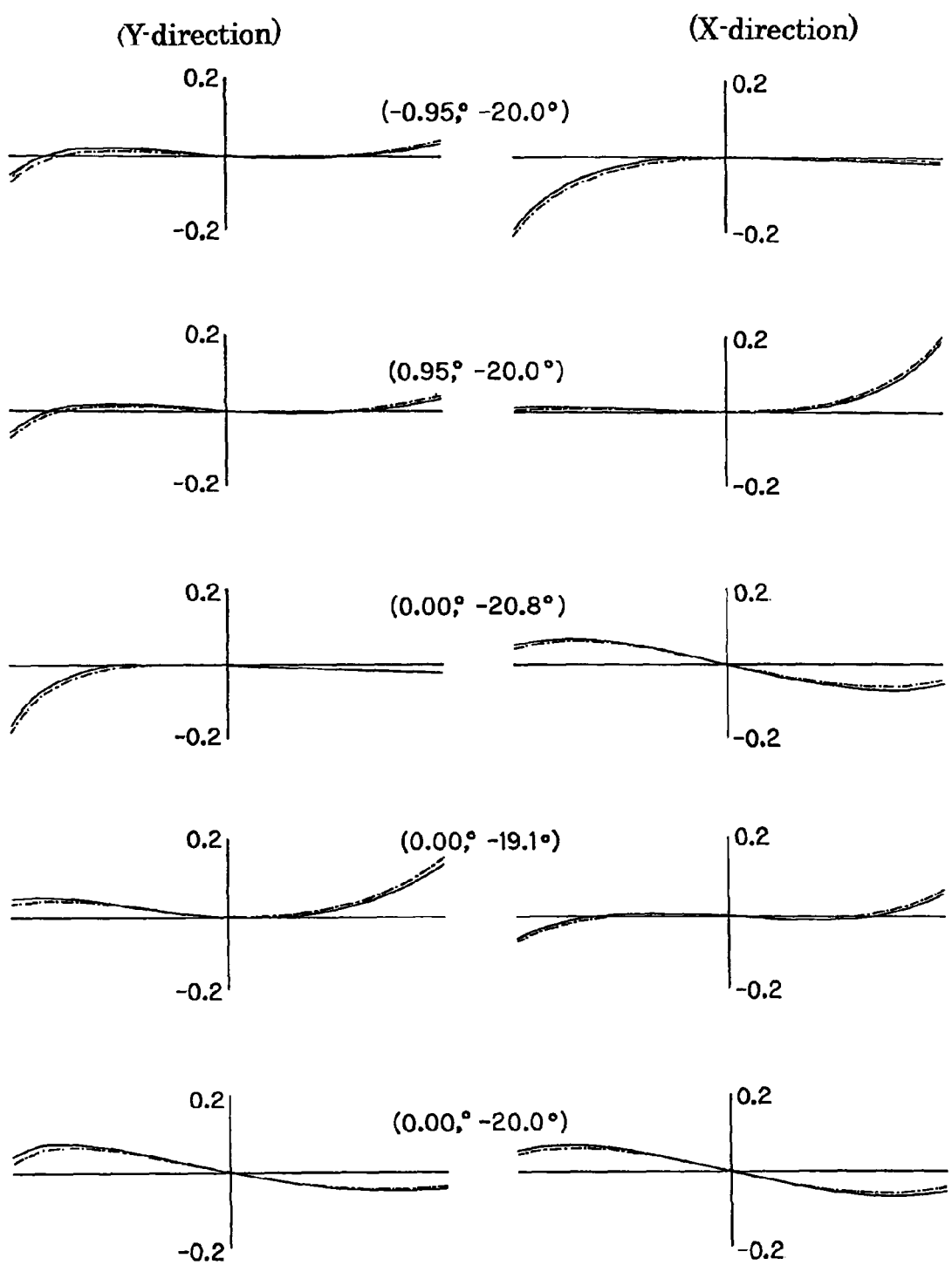
FIG. 21 is a transverse aberration diagram for the whole optical system according to Example 2.

The specifications of Example 1 are:
Exit pupil diameter: φ65 mm
Display plane size: X4.50 mm×Y5.00 mm
Image size: □10 mm×10 mm Example 2 is now given. FIG. 18 is a sectional view of part of the optical system in the visual display apparatus of Example 2 as taken along the center axis 1; FIG. 19 is a plan view of an optical path through part of the optical system as viewed in a direction along the center line 1; and FIG. 20 is a plan view of the whole optical system as viewed in a direction along the center line 1. In FIGS. 18 and 19, only some of the subordinate optical systems 3 and display planes 5 are shown, and exit pupils 4 (FIG. 13) are left out for reasons of space. FIG. 21 is a transverse aberration diagram for the whole optical system of this example.

In Example 2, the main optical system 2 is made up of a reflecting surface 21 having positive power and comprising an expanded rotation free surface obtained by the rotation about the center axis 1 of a curve including an odd-numbered term, and 30 subordinate optical systems 3 of the same construction juxtaposed on a circumference concentric about the center axis 1 are each made up of a lens a convex first surface 31 and a cylindrical second surface 32 with its center axis defined by the center axis 1. A stop is defined by an aperture around the first surface 31 of each subordinate optical system 3 that faces the main optical system 2, and an image of that stop by the main optical system 2 defines an exit pupil 4 (not shown) on a side far way from each subordinate optical system 3 via the center axis 1. With thirty subordinate optical systems 3 of the same construction juxtaposed on the circumference concentric about the center axis 1, the exit pupils 4 of combined optical systems consisting of the main optical system 2 and the respective subordinate optical systems 3 are placed in concentric juxtaposition about the center axis 1. And then, the respective exit pupils 4 are sized such that when placed in juxtaposition, they are stitched together on that circumference in a substantially back-to-back relation.

The display plane 5 is located at a cylindrical surface the same as the second surface 32 of each subordinate optical system 3 while it is conjugate to the center axis 1, and a real image on that display plane 5 is formed as an enlarged view 6 near the center axis 1 by the combined power of the lens that is the subordinate optical system 3 and the reflecting surface 21 of the main optical system 2; that virtual image can be viewed from the side far away from the display plane 5 via the center axis 1.

The arrangement being like this, as the viewer brings his eye near any of the exit pupils 4, he will be able to view the enlarged image 6 that is formed on the display plane 5 located on the image plane of the combined optical system (main 2 and subordinate optical system 3) to define that exit pupil 4, and near the center axis 1. And, there are twelve combined optical systems, each consisting of the main 2 and the subordinate optical system 3, located in 12° segments about the center axis 1. Therefore, as the center axis 1 is set in the vertical direction, it will enable the viewer to view the enlarged image 6 of the image displayed on the display plane 5 (that is opposite to that exit pupil 4 with the center axis 1 located between them) at a position corresponding to the exit pupil 4 at which the viewer's eye is positioned even in any of the surrounding 360-degree directions about the center axis 1.

While it is shown and described that the display planes 5 are each defined by the outside of the cylindrical surface, it is contemplated that the whole display surface is configured into a truncated cone. While that whole display surface may be set up with the use of one single display device, it is understood that it may be constructed of thirty planar display devices located on the respective sides of a truncated cone (30-angular pyramid) in a rotationally symmetric way.

Figure 22:
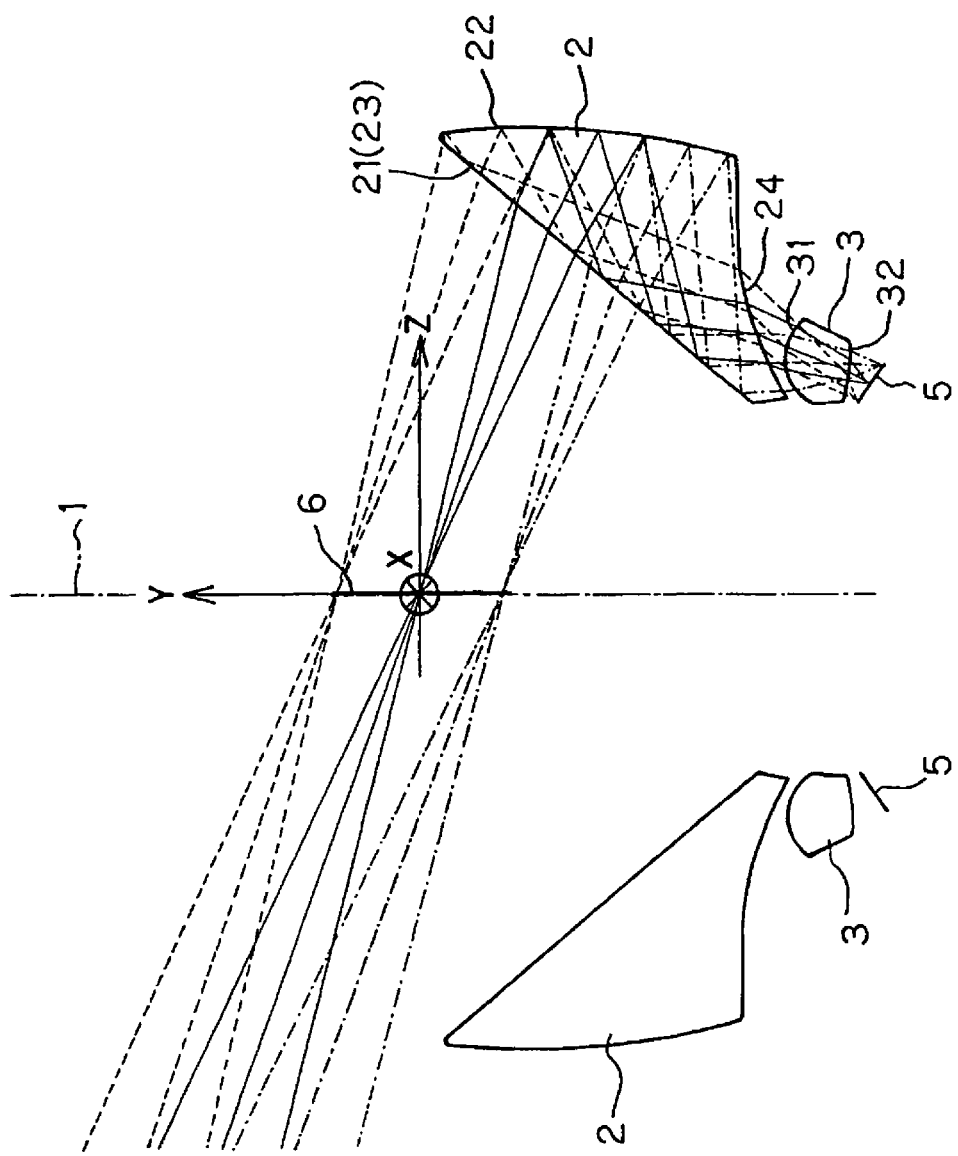
FIG. 22 is a sectional view of part of the optical system in the visual display apparatus according to Example 3 of the invention, as taken along the center axis.
Figure 23:
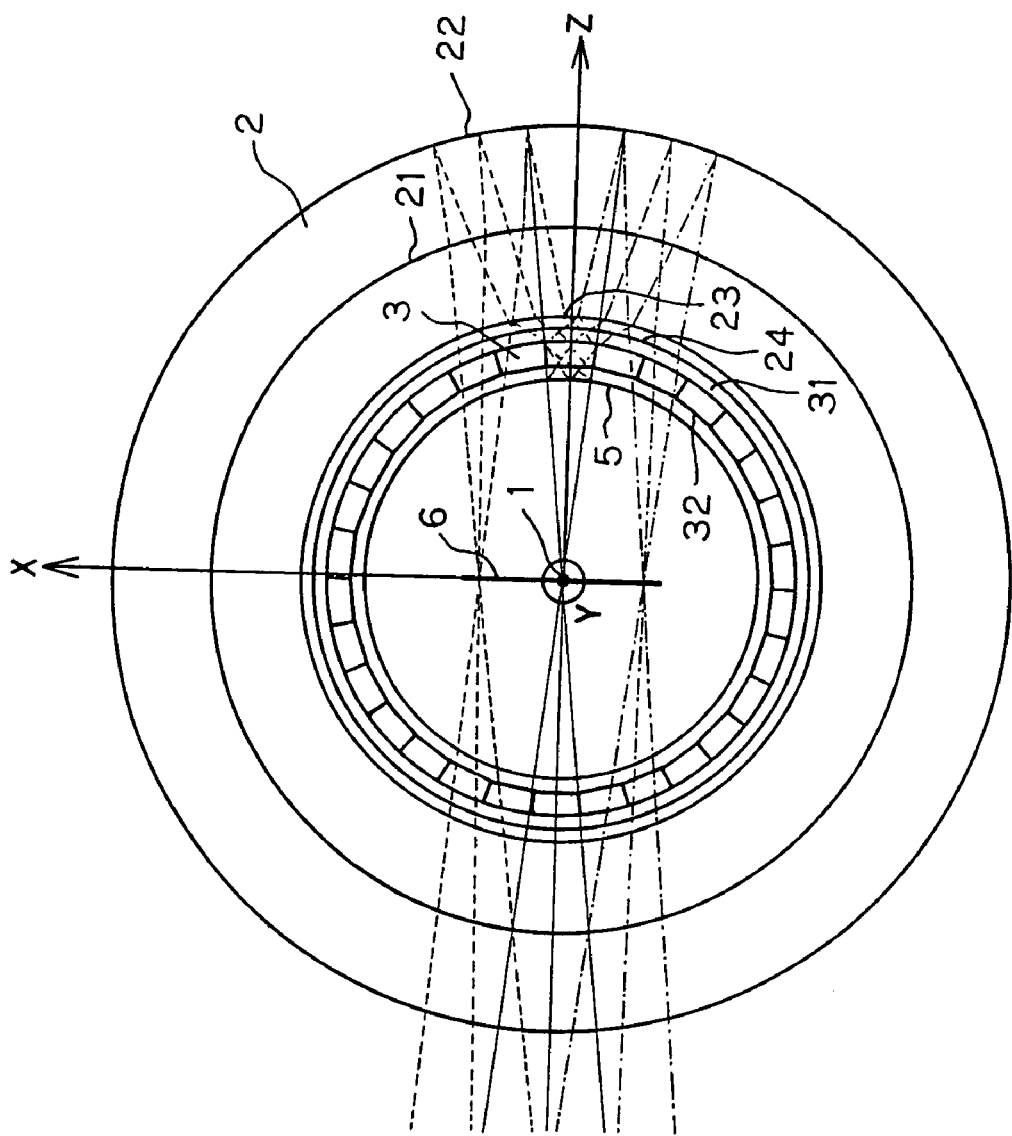
FIG. 23 is a plan view of the whole optical system according to Example 3, as viewed in a direction along the center axis.
Figure 24:
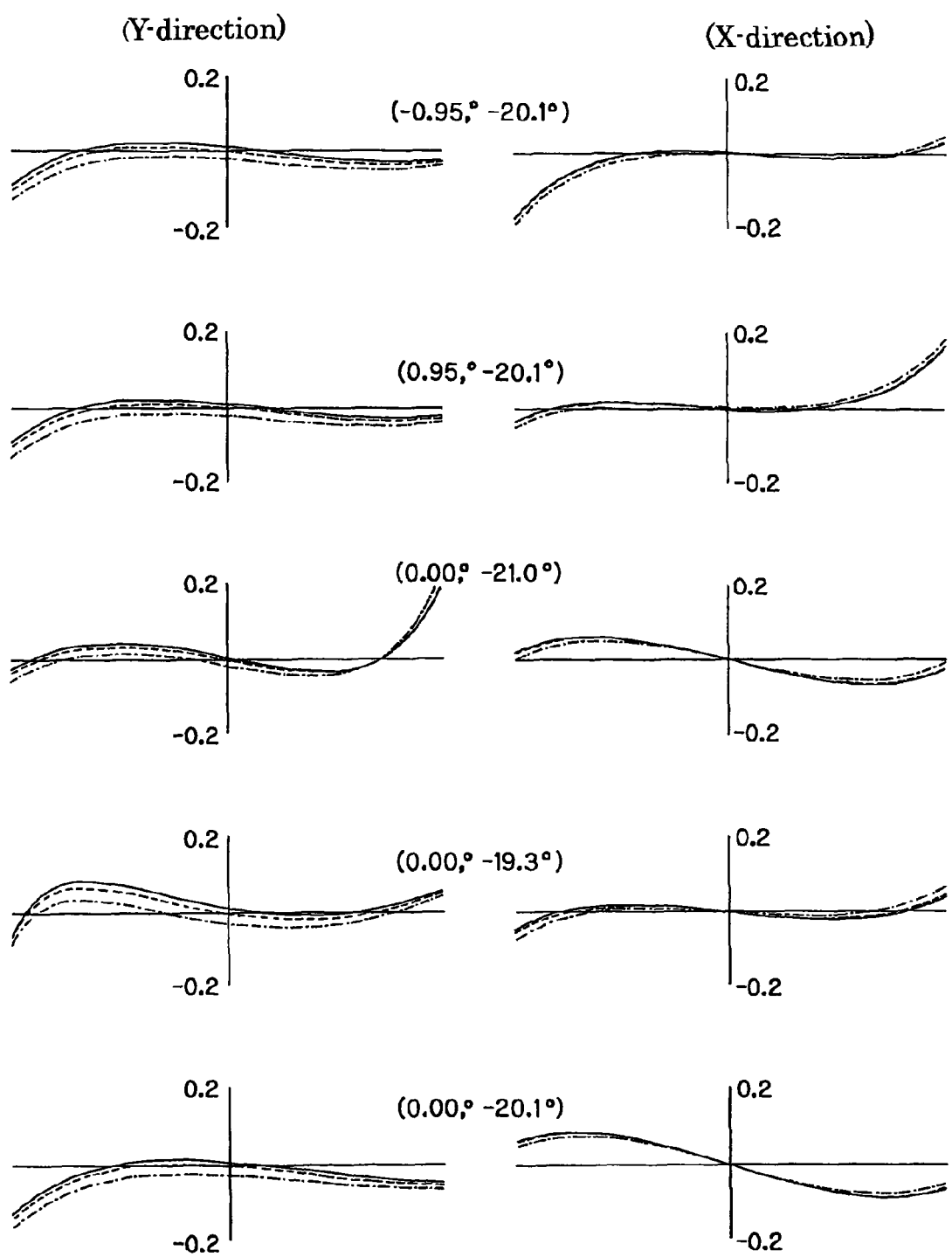
FIG. 24 is a transverse aberration diagram for the whole optical system according to Example 3.

The specifications of Example 1 are:
Exit pupil diameter: φ65 mm
Display plane size: X2.00 mm×Y1.96 mm
Image size: □10 mm×10 mm Example 3 is now given. FIG. 22 is a sectional view of part of the optical system in the visual display apparatus of Example 3 as taken along the center axis 1, and FIG. 23 is a plan view of the whole optical system as viewed in a direction along the center line. In FIGS. 22 and 23, exit pupils 4 (FIG. 13) are left out for reasons of space. FIG. 24 is a transverse aberration diagram for the whole optical system of this example.

In Example 3, the main optical system 2 is made up of a catadioptric optical system that assumes on a prism shape capable of two internal reflections in a section including the center axis 1 and is concentric and rotationally symmetric about the center axis 1. To be more specific, the main optical system 2 is built up of a refracting first surface 21 made up of a toric surface, a reflecting second surface 22 made up of an extended rotation free surface obtained by the rotation of a curve including an odd-numbered term about the center axis 1 and having positive power, a total-reflection third surface 23 that is defined by the first surface 21, and a refracting fourth surface 24 made up of a toric surface. In the order of back tracing, light rays are refracted at the first surface 21, reflected at the second surface 22, and subjected to total reflection at the third surface 23, leaving the main optical system 2 through the fourth surface 24. And then, 30 subordinate optical systems 3 of the same construction are juxtaposed on a circumference concentric about the center axis 1, facing the fourth surface 24 of the main optical system 2. The subordinate optical systems 3 are made up of mutually decentered double-convex lenses. And, a stop is defined by an aperture around the first surface 31 of each subordinate optical system 3 that faces the main optical system 2, and an image of that stop by the main optical system 2 defines an exit pupil 4 (not shown) on a side far away from each subordinate optical system 3 via the center axis 1. With thirty subordinate optical systems 3 of the same construction juxtaposed on the circumference concentric about the center axis 1, the exit pupils 4 of combined optical systems consisting of the main optical system 2 and the respective subordinate optical system 3 are placed in concentric juxtaposition about the center axis 1. And then, the respective exit pupils 4 are sized such that when placed in juxtaposition, they are stitched together on that circumference in a substantially back-to-back relation.

The display plane 5 is located facing the second surface 32 of each subordinate optical system 3 while it is conjugate to the center axis 1, and a real image on that display plane 5 is formed as an enlarged view 6 near the center axis 1 by the combined power of the subordinate optical system 3 and the main optical system 2; that virtual image can be viewed from the side away from the display plane 5 via the center axis 1.

The arrangement being like this, as the viewer brings his eye near any of the exit pupils 4, he will be able to view the enlarged image 6 that is formed on the display plane 5 located on the image plane of the combined optical system (main optical system 2 and subordinate optical system 3) to define that exit pupil 4, and near the center axis 1. And, there are the combined optical systems, each consisting of the main optical system 2 and the subordinate optical system 3, located in 12° segments about the center axis 1. Therefore, as the center axis 1 is set in the vertical direction, it will enable the viewer to view the enlarged image 6 of the image displayed on the display plane 5 (that is opposite to that exit pupil 4 with the center axis 1 located between them) at a position corresponding to the exit pupil 4 at which the viewer's eye is positioned even in any of the 360-degree directions around the center axis 1.

While it is shown and described that the display planes 5 are each defined by the outside of the cylindrical surface, it is contemplated that the whole display surface is configured into a truncated cone. While that whole display surface may be set up with the use of one single display device, it is understood that it may be constructed of thirty planar display devices located on the respective sides of a truncated cone (30-angular pyramid) in a rotationally symmetric way.

The specifications of Example 1 are:
Exit pupil diameter: φ65 mm
Display plane size: X2.60 mm×Y2.66 mm
Image size: □10 mm×10 mm Constituting parameters in Examples 1-3 are now set out below. In the following table, "ERFS" and "RS" are indicative of an extended rotation free-form surface and a reflecting surface, respectively.

Example 1

| Surface No. | Radius of curvature | Surface separation | Displacement and tilt | Refractive index | Abbe's No. |
|---|---|---|---|---|---|
| Object plane | ∞ | | | | |
| 1 | ∞ (Pupil) | | (1) | | |
| 2 | 15.00 | | (2) | 1.5163 | 64.1 |
| 3 | −15.00 | | (3) | | |
| 4 | ∞ (Stop) | | (4) | | |
| 5 | 4.18 | | (4) | 1.5163 | 64.1 |
| 6 | ∞ | | (5) | | |
| Image plane | ∞ | | (6) | | |

| Displacement and tilt(1) | | | | | |
|---|---|---|---|---|---|
| X | 0.00 | Y | 150.00 | Z | −300.00 |
| α | 0.00 | β | 0.00 | γ | 0.00 |
| Displacement and tilt(2) | | | | | |
| X | 0.00 | Y | 6.71 | Z | −13.42 |
| α | −26.57 | β | 0.00 | γ | 0.00 |
| Displacement and tilt(3) | | | | | |
| X | 0.00 | Y | −6.71 | Z | 13.42 |
| α | −26.57 | β | 0.00 | γ | 0.00 |
| Displacement and tilt(4) | | | | | |
| X | 0.00 | Y | −9.84 | Z | 19.68 |
| α | −26.57 | β | 0.00 | γ | 0.00 |
| Displacement and tilt(5) | | | | | |
| X | 0.00 | Y | −16.92 | Z | 33.84 |
| α | −26.57 | β | 0.00 | γ | 0.00 |
| Displacement and tilt(6) | | | | | |
| X | 0.00 | Y | −17.14 | Z | 34.28 |
| α | −34.88 | β | 0.00 | γ | 0.00 |

Example 2

| Surface No. | Radius of curvature | Surface separation | Displacement and tilt | Refractive index | Abbe's No. |
|---|---|---|---|---|---|
| Object plane | ∞ | | | | |
| 1 | ∞ (Pupil) | | (1) | | |
| 2 | ERFS[1] (RS) | | (2) | | |
| 3 | ∞ (Stop) | | (3) | | |
| 4 | −2.20 | | (3) | 1.5163 | 64.1 |
| 5 | ERFS[2] | | (4) | | |
| Image plane | ERFS[2] | | (4) | | |

-continued

ERFS[1]

| | | |
|---|---|---|
| RY | | −32.87 |
| θ | | −2.00 |
| R | | 30.00 |
| $C_4$ | | $1.2542 \times 10^{-4}$ |
| $C_5$ | | $-8.3933 \times 10^{-7}$ |

ERFS[2]

| | | |
|---|---|---|
| RY | | ∞ |
| θ | | 0.00 |
| R | | 10.56 |

Displacement and tilt(1)

| X | 0.00 | Y | 109.00 | Z | −300.00 |
|---|---|---|---|---|---|
| α | 0.00 | β | 0.00 | γ | 0.00 |

Displacement and tilt(2)

| X | 0.00 | Y | −10.90 | Z | 0.00 |
|---|---|---|---|---|---|
| α | 0.00 | β | 0.00 | γ | 0.00 |

Displacement and tilt(3)

| X | 0.00 | Y | −15.19 | Z | 15.00 |
|---|---|---|---|---|---|
| α | 21.24 | β | 0.00 | γ | 0.00 |

Displacement and tilt(4)

| X | 0.00 | Y | −16.61 | Z | 0.00 |
|---|---|---|---|---|---|
| α | 0.00 | β | 0.00 | γ | 0.00 |

Example 3

| Surface No. | Radius of curvature | Surface separation | Displacement and tilt | Refractive index | Abbe's No. |
|---|---|---|---|---|---|
| Object plane | ∞ | | | | |
| 1 | ∞ (Pupil) | | (1) | | |
| 2 | ERFS[1] | | (2) | 1.5163 | 64.1 |
| 3 | ERFS[2] (RS) | | (3) | 1.5163 | 64.1 |
| 4 | ERFS[1] (RS) | | (2) | 1.5163 | 64.1 |
| 5 | ERFS[3] | | (4) | | |
| 6 | ∞ (Stop) | | (5) | | |
| 7 | 2.87 | | (5) | 1.5163 | 64.1 |
| 8 | −8.86 | | (6) | | |
| Image plane | ∞ | | (7) | | |

ERFS[1]

| | | |
|---|---|---|
| RY | | −2543.21 |
| θ | | −40.00 |
| R | | 16.06 |

ERFS[2]

| | | |
|---|---|---|
| RY | | −48.97 |
| θ | | −5.00 |
| R | | 27.44 |
| $C_4$ | | $1.8573 \times 10^{-5}$ |
| $C_5$ | | $4.8136 \times 10^{-6}$ |

ERFS[3]

| | | |
|---|---|---|
| RY | | 25.60 |
| θ | | −70.58 |
| R | | 15.32 |

Displacement and tilt(1)

| X | 0.00 | Y | 110.00 | Z | −300.00 |
|---|---|---|---|---|---|
| α | 0.00 | β | 0.00 | γ | 0.00 |

Displacement and tilt(2)

| X | 0.00 | Y | −14.39 | Z | 0.00 |
|---|---|---|---|---|---|
| α | 0.00 | β | 0.00 | γ | 0.00 |

Displacement and tilt(3)

| X | 0.00 | Y | −10.91 | Z | 0.00 |
|---|---|---|---|---|---|
| α | 0.00 | β | 0.00 | γ | 0.00 |

Displacement and tilt(4)

| X | 0.00 | Y | −20.45 | Z | 0.00 |
|---|---|---|---|---|---|
| α | 0.00 | β | 0.00 | γ | 0.00 |

Displacement and tilt(5)

| X | 0.00 | Y | −22.18 | Z | 14.58 |
|---|---|---|---|---|---|
| α | −107.20 | β | 0.00 | γ | 0.00 |

Displacement and tilt(6)

| X | 0.00 | Y | −26.01 | Z | 13.10 |
|---|---|---|---|---|---|
| α | −96.52 | β | 0.00 | γ | 0.00 |

Displacement and tilt(7)

| X | 0.00 | Y | −27.36 | Z | 12.36 |
|---|---|---|---|---|---|
| α | −124.88 | β | 0.00 | γ | 0.00 |

Figure 25:
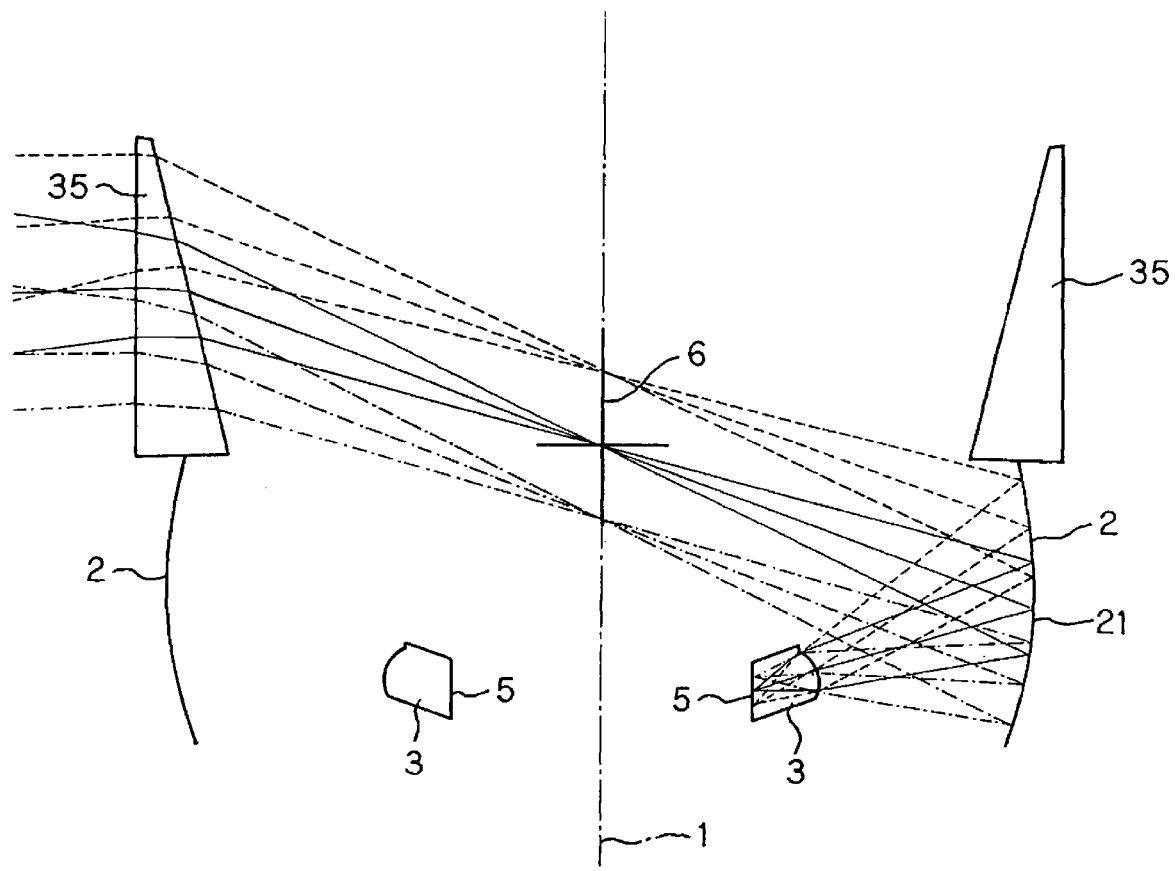
FIG. 25 is a view corresponding to FIG. 18 of one embodiment where the viewing direction is set in substantially the horizontal direction.

Referring further to Examples 1, 2 and 3, it is described that with the center axis 1 set as the vertical direction, the viewing direction lies at a somehow overlooking angle, not in the horizontal direction, (as indicated in terms of a depression angle of 26°, 20° and 20° in Examples 1, 2 and 3, respectively). In an example, the viewing direction is set in substantially the horizontal direction, as shown in FIG. 25 corresponding to FIG. 18. In this example, the arrangement of Example 2 is modified such that a rotationally symmetric prism unit 35 rotationally symmetric about the center axis 1, which acts as an angle-of-deflection prism for setting the viewing direction substantially horizontal in a section including the center axis 1, is located on the side of the main optical system 2 (the reflecting surface 21 in FIG. 25) that faces away from the subordinate optical system 3. As shown in FIG. 25, by the addition of the rotationally symmetric prism unit 35 obtained by the rotation of a wedge section about the center axis 1, it is possible to place the viewing angle substantially horizontal. Furthermore, if the surfaces forming this rotationally symmetric prism unit 25 are each made of an extended rotation free-form surface, it is then possible to give power to it only in the meridional section (the section including the center axis 1).

Figure 26:
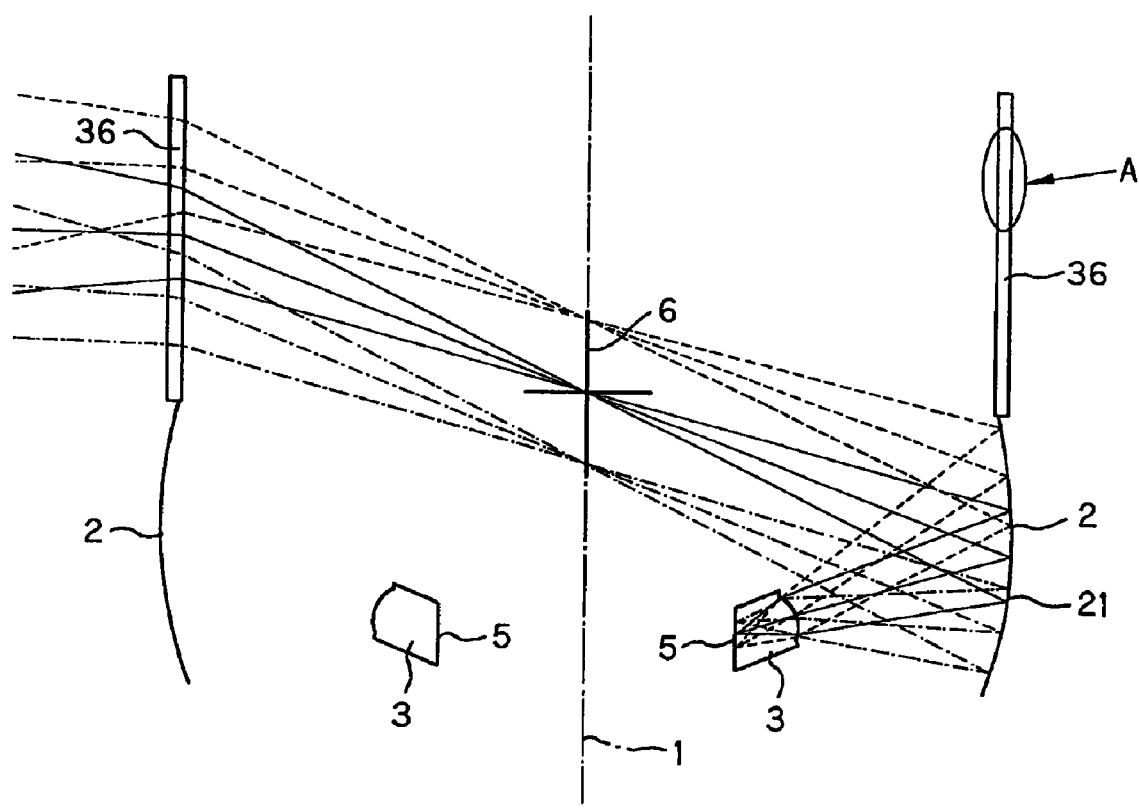
FIG. 26 is a view corresponding to FIG. 18 of an embodiment wherein a rotationally symmetric Fresnel prism unit is used for setting the viewing direction in substantially the horizontal direction.
Figure 27A:
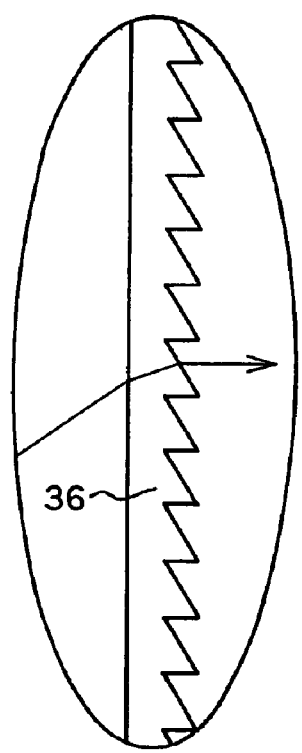
FIG. 27 is a sectional view of details of the rotationally symmetric Fresnel prism unit.
Figure 27B:
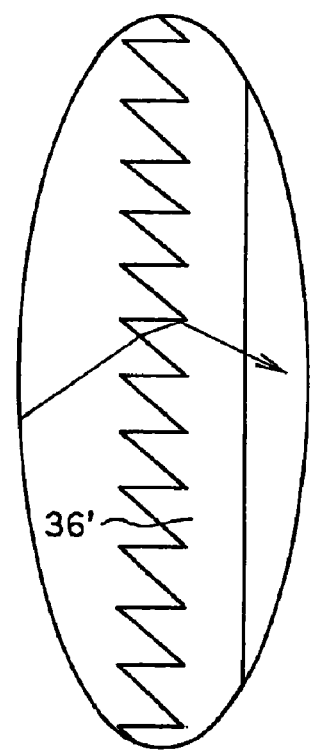

FIG. 26 is illustrative, corresponding to FIG. 18, of an example wherein instead of the rotationally symmetric prism unit 35 in the example of FIG. 25, a rotationally symmetric Fresnel prism unit 36 having a Fresnel prism surface rotationally symmetric about the center axis 1 is used to again place the viewing direction substantially in the horizontal direction. The section of that rotationally symmetric Fresnel prism unit 36 including the center axis 1 has such a shape as shown in FIG. 27(*a*) that is an enlarged sectional view of an area indicated by A in FIG. 26. If a rotationally symmetric Fresnel reflecting prism unit 36' is used as that rotationally symmetric prism unit 36 for the purpose of setting the viewing direction at an elevation angle, not in substantially the horizontal direction, as shown in the partly sectioned view of FIG. 27(*a*). This rotationally symmetric Fresnel prism unit 36' does not only refract viewing light but also reflects it at a fine zonal surface at an angle of deflection.

The application of such rotationally symmetric Fresnel prism unit 36 to the optical system in the inventive visual display apparatus works for weight reductions, because the optical element to be added can be slimmed down.

Figure 28A:
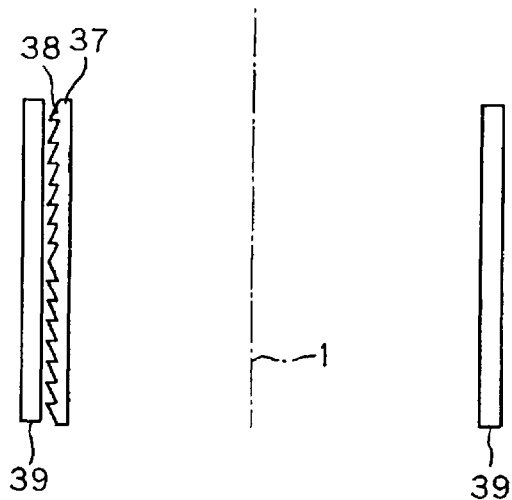
FIG. 28 is illustrative of how to make up a rotationally symmetric linear Fresnel reflecting surface.
Figure 28B:
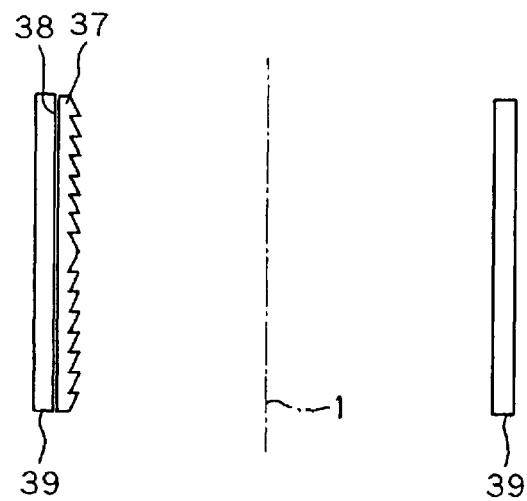
Figure 28C:
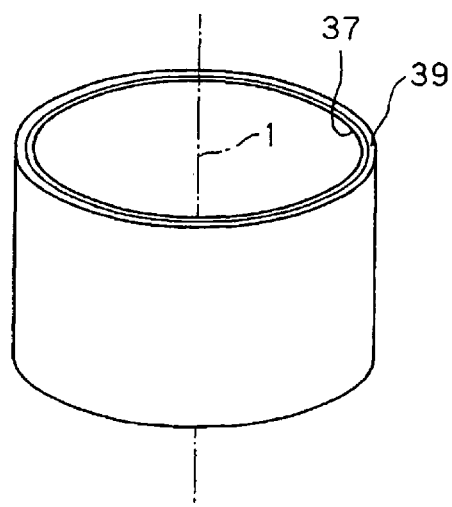

The invention is not always limited to the use of only the transmitting element adapted to change the viewing direction, as shown in FIGS. 26 and 27. For instance, other reflecting surface constituting the main optical system 2 such as the reflecting surface 21 in Example 2 may be constructed of a rotationally symmetric, linear Fresnel reflecting surface. In this case, of course, it is more preferable that such a linear Fresnel reflecting surface is one obtained by the rotation of a curve including an odd-numbered term about the axis of rotational symmetry. FIG. 28 is illustrative of how to set up a rotationally symmetric, linear Fresnel reflecting surface. As shown typically in the sectional view of FIG. 28(*a*) and the perspective view of FIG. 28(*c*), a linear Fresnel lens with a sheet-form reflective coating 38 applied to a Fresnel surface (Fresnel lens having power in a one-dimensional direction alone) 37 may be bonded to the inner surface of a pipe-form round tube 39 with a reflective coating 38 applied to that inner surface while the linear Fresnel lens 37 is directed in a circumferential direction.

Referring further to the optical system, as described above, in the visual display apparatus of the invention, by using the optical system (main optical system 2 plus subordinate optical system 3) rotationally symmetric about the center axis 1 as it stands, the enlarged images 6 on the display planes (image planes) 5 on the display surface (display device) 15 may be viewed from the full 360-degree directions around the optical system. However, if that optical system is divided into ½, ⅓, ⅔ or like segments in the section including the center axis 1, it is of course possible to view the enlarged images 6 in segments of 180°, 120°, 240° or the like around the center axis 1.

I claim:

1. A visual display apparatus, comprising a main optical system that is concentric and rotationally symmetric about a center axis and a plurality of subordinate optical systems of identical construction, which are juxtaposed on a circumference concentric about the center axis, wherein a combined optical system comprising the main optical system and each subordinate optical system has an exit pupil positioned on a side of the main optical system facing away from each subordinate optical system and on a side of the center axis facing away from each subordinate optical system on an optical path, display planes of display devices are located on a side of the subordinate optical systems facing away from the main optical system, images on display planes by the combined optical systems are formed near the center axis, and exit pupils of the combined optical systems are formed concentrically about the center axis in a substantially back-to-back relation.

2. The visual display apparatus according to claim 1, wherein images taken of an identical object from a plurality of points of view are displayed on said display planes so that said images can be stereoscopically viewed.

3. The visual display apparatus according to claim 1 or 2, wherein said display planes are formed by rotationally symmetric location of a plurality of planar display devices.

4. The visual display apparatus according to claim 1 or 2, wherein said display planes are configured by rounding off a two-dimensional display device into a three-dimensional one.

5. The visual display apparatus according to claim 2, wherein at least one surface of said main optical system varies in curvature between a longitudinal section including an axis of rotational symmetry and a cross section orthogonal to the axis of rotational symmetry.

6. The visual display apparatus according to claim 3, wherein at least one surface of said main optical system varies in curvature between a longitudinal section including an axis of rotational symmetry and a cross section orthogonal to the axis of rotational symmetry.

7. The visual display apparatus according to claim 4, wherein at least one surface of said main optical system varies in curvature between a longitudinal section including an axis of rotational symmetry and a cross section orthogonal to the axis of rotational symmetry.

8. The visual display apparatus according to claim 5, wherein at least one surface of said main optical system has a rotationally symmetric configuration formed by rotation of a curve of any desired shape having no plane of symmetry about the axis of rotational symmetry.

9. The visual display apparatus according to claim 6, wherein at least one surface of said main optical system has a rotationally symmetric configuration formed by rotation of a curve of any desired shape having no plane of symmetry about the axis of rotational symmetry.

10. The visual display apparatus according to claim 7, wherein at least one surface of said main optical system has a rotationally symmetric configuration formed by rotation of a curve of any desired shape having no plane of symmetry about the axis of rotational symmetry.

11. The visual display apparatus according to claim 8, wherein at least one surface of said main optical system has a rotationally symmetric configuration formed by rotation of a curve of any desired shape including an odd-numbered term about the axis of rotational symmetry.

12. The visual display apparatus according to claim 9, wherein at least one surface of said main optical system has a rotationally symmetric configuration formed by rotation of a curve of any desired shape including an odd-numbered term about the axis of rotational symmetry.

13. The visual display apparatus according to claim 10, wherein at least one surface of said main optical system has a rotationally symmetric configuration formed by rotation of a curve of any desired shape including an odd-numbered term about the axis of rotational symmetry.

14. The visual display apparatus according to claim 1 or 2, wherein the following condition is satisfied:

$$10\text{ mm} < Rs \qquad (1)$$

where Rs is half an outside diameter of said main optical system.

15. The visual display apparatus according to claim 3, wherein the following condition is satisfied:

$$10\text{ mm} < Rs \qquad (1)$$

where Rs is half an outside diameter of said main optical system.

16. The visual display apparatus according to claim 4, wherein the following condition is satisfied:

$$10\text{ mm} < Rs \qquad (1)$$

where Rs is half an outside diameter of said main optical system.

17. The visual display apparatus according to claim 5, wherein the following condition is satisfied:

$$10\text{ mm} < Rs \qquad (1)$$

where Rs is half an outside diameter of said main optical system.

18. The visual display apparatus according to claim 6, wherein the following condition is satisfied:

$$10\text{ mm} < Rs \qquad (1)$$

where Rs is half an outside diameter of said main optical system.

19. The visual display apparatus according to claim 7, wherein the following condition is satisfied:

$$10 \text{ mm} < Rs \quad (1)$$

where Rs is half an outside diameter of said main optical system.

20. The visual display apparatus according to claim 8, wherein the following condition is satisfied:

$$10 \text{ mm} < Rs \quad (1)$$

where Rs is half an outside diameter of said main optical system.

21. The visual display apparatus according to claim 9, wherein the following condition is satisfied:

$$10 \text{ mm} < Rs \quad (1)$$

where Rs is half an outside diameter of said main optical system.

22. The visual display apparatus according to claim 10, wherein the following condition is satisfied:

$$10 \text{ mm} < Rs \quad (1)$$

where Rs is half an outside diameter of said main optical system.

23. The visual display apparatus according to claim 11, wherein the following condition is satisfied:

$$10 \text{ mm} < Rs \quad (1)$$

where Rs is half an outside diameter of said main optical system.

24. The visual display apparatus according to claim 12, wherein the following condition is satisfied:

$$10 \text{ mm} < Rs \quad (1)$$

where Rs is half an outside diameter of said main optical system.

25. The visual display apparatus according to claim 13, wherein the following condition is satisfied:

$$10 \text{ mm} < Rs \quad (1)$$

where Rs is half an outside diameter of said main optical system.

26. The visual display apparatus according to claim 3, wherein there is a light block member located in an area through which light rays do not transmit.

27. The visual display apparatus according to claim 4, wherein there is a light block member located in an area through which light rays do not transmit.

28. The visual display apparatus according to claim 5, wherein there is a light block member located in an area through which light rays do not transmit.

29. The visual display apparatus according to claim 6, wherein there is a light block member located in an area through which light rays do not transmit.

30. The visual display apparatus according to claim 7, wherein there is a light block member located in an area through which light rays do not transmit.

31. The visual display apparatus according to claim 8, wherein there is a light block member located in an area through which light rays do not transmit.

32. The visual display apparatus according to claim 9, wherein there is a light block member located in an area through which light rays do not transmit.

33. The visual display apparatus according to claim 10, wherein there is a light block member located in an area through which light rays do not transmit.

34. The visual display apparatus according to claim 11, wherein there is a light block member located in an area through which light rays do not transmit.

35. The visual display apparatus according to claim 12, wherein there is a light block member located in an area through which light rays do not transmit.

36. The visual display apparatus according to claim 13, wherein there is a light block member located in an area through which light rays do not transmit.

37. The visual display apparatus according to claim 3, wherein there is an illumination unit provided so as to illuminate a whole of said display planes from every direction on a side opposite to a side of said subordinate optical systems.

38. The visual display apparatus according to claim 4, wherein there is an illumination unit provided so as to illuminate a whole of said display planes from every direction on a side opposite to a side of said subordinate optical systems.

* * * * *